United States Patent
Takahashi et al.

(10) Patent No.: US 7,599,551 B2
(45) Date of Patent: Oct. 6, 2009

(54) COLOR CORRECTION DEVICE AND COLOR CORRECTION METHOD

(75) Inventors: Mariko Takahashi, Tokyo (JP); Narihiro Matoba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 323 days.

(21) Appl. No.: 10/538,942

(22) PCT Filed: Nov. 14, 2003

(86) PCT No.: PCT/JP03/14529

§ 371 (c)(1),
(2), (4) Date: Jun. 13, 2005

(87) PCT Pub. No.: WO2005/048583

PCT Pub. Date: May 26, 2005

(65) Prior Publication Data
US 2006/0120598 A1   Jun. 8, 2006

(51) Int. Cl.
G06K 9/00 (2006.01)
G06K 9/36 (2006.01)

(52) U.S. Cl. ........................ 382/167; 382/166

(58) Field of Classification Search ......... 382/162–166, 382/167
See application file for complete search history.

(56) References Cited

U.S. PATENT DOCUMENTS

| 2002/0029715 A1* | 3/2002 | Ogatsu et al. ............... 101/494 |
| 2002/0039106 A1* | 4/2002 | Shimada ..................... 345/604 |
| 2003/0164968 A1* | 9/2003 | Iida ........................... 358/1.9 |

FOREIGN PATENT DOCUMENTS

| JP | 05-061952 | * | 3/1993 |
| JP | 5-61952 A | | 3/1993 |
| JP | 9-258706 A | | 10/1997 |
| JP | 11-341296 A | | 12/1999 |
| JP | 2000-022978 | * | 1/2000 |
| JP | 2000-22978 A | | 1/2000 |
| JP | 2000-354171 A | | 12/2000 |
| JP | 2001-111859 A | | 4/2001 |
| JP | 2002-118764 A | | 4/2002 |
| JP | 2002-152536 A | | 5/2002 |
| JP | 2002-252785 A | | 9/2002 |
| JP | 2002-369018 A | | 12/2002 |
| JP | 2003-8913 A | | 1/2003 |

* cited by examiner

*Primary Examiner*—John B Strege
(74) *Attorney, Agent, or Firm*—Birch, Stewart, Kolasch & Birch, LLP

(57) ABSTRACT

A color correction apparatus is provided including a color correction means 1 for making a color correction to an input image signal 101, and a color gamut compression means 2 for performing color gamut compression on the color-corrected input image signal based on color reproduction characteristics data 103 describing color reproduction characteristics so that the color-corrected image data outputted from the color correction means 1 has a chromaticity range which is contained in a color reproduction region which is based on the color reproduction characteristics.

26 Claims, 11 Drawing Sheets

COLOR REPRODUCTION CHARACTERISTICS DATA

| HUE NUMBER | CHROMATICITY INDICATING COLOR REPRODUCTION CHARACTERISTICS OF COLOR IMAGE DISPLAY APPARATUS | CHROMATICITY INDICATING TARGET COLOR REPRODUCTION CHARACTERISTICS |
|---|---|---|
| 0 | | |
| 1 | | |
| 2 | | |
| 3 | | |
| 4 | | |
| 5 | | |

COLOR REPRODUCTION CHARACTERISTICS DATA

| HUE NUMBER | CHROMATICITY INDICATING COLOR REPRODUCTION CHARACTERISTICS OF COLOR IMAGE DISPLAY APPARATUS |
|---|---|
| 0 | |
| 1 | |
| 2 | |
| 3 | |
| 4 | |
| 5 | |

COLOR REPRODUCTION CHARACTERISTICS DATA

| HUE NUMBER | CHROMATICITY INDICATING COLOR REPRODUCTION CHARACTERISTICS OF COLOR IMAGE DISPLAY APPARATUS | CHROMATICITY INDICATING COLOR REPRODUCTION CHARACTERISTICS OF ORIGINAL IMAGE |
|---|---|---|
| 0 | | |
| 1 | | |
| 2 | | |
| 3 | | |
| 4 | | |
| 5 | | |

COLOR CORRECTION DEVICE AND COLOR CORRECTION METHOD

FIELD OF THE INVENTION

The present invention relates to a color correction apparatus for and a color correction method of performing color gamut compression processing based on color reproduction characteristics.

BACKGROUND OF THE INVENTION

There has been provided an invention disclosed in JP,2002-369018,A as a related art color correction apparatus. The color correction apparatus according to the disclosed invention acquires a color-corrected target color by using a color difference minimum method based on both the color characteristics of a calibrated basic color image device and the color characteristics of another reference color image device having color characteristics different from those of the basic color image device, computes a color correction parameter from the target color and an input color applied to the reference color image device, and furnishes this color correction parameter to the reference color image device. In general, when color adjustment is performed on an image signal indicating a certain chromaticity range, the color-adjusted image signal may indicate a chromaticity range which is not contained in a color reproduction region reproducible by the color image display apparatus. However, the color correction apparatus in accordance with the above-mentioned invention does not take into consideration a process of handling such a chromaticity range which is not contained in a color reproduction region produced through color adjustment.

There has been provided an invention disclosed in JP,11-341296,A as another related art color correction apparatus. When outputting, as a printed sheet of paper, an image displayed on a monitor or the like which is an input device to a printer which is an output device, the other color correction apparatus in accordance with the present invention processes the image according to a look-up table (referred to as a LUT from here on) by using a control unit so that the image is expressed on a sheet of paper using the color gamut of the printer. In other words, when the color reproduction region for the input device differs from the color reproduction region for the output device, the other color correction apparatus performs color gamut conversion on the chromaticity range of an input image signal so that it is headed for a convergence point within the color reproduction region for the output device. In this color gamut conversion, the other color correction apparatus performs three dimension compression processing on the color gamut of the input device. When performing three dimension color gamut conversion on the value, saturation, and hue of an input image signal, the other color correction apparatus uses a three dimension LUT. Although the use of the three dimension LUT reduces the operation speed of the other color correction apparatus, the application of the other color correction apparatus to still pictures presents no problem. However, the application of the other color correction apparatus to moving images has harmful effects.

A problem with the related art color correction apparatus constructed as mentioned above, and the related art color correction methods implemented as mentioned above is that when color adjustment is performed on an input image signal, either of the hue, value, and saturation of the signal unavoidably changes with the color adjustment, the color adjustment cannot be performed appropriately since the chromaticity range which is no longer contained in the color reproduction region through the color adjustment is not taken into consideration, and, especially, a chromaticity range having a high saturation cannot be adjusted finely. A further problem is that when a three dimension LUT is used for color gamut compression processing which is carried out when correcting the hue, value, and saturation of the input image signal, the processing speed decreases.

The present invention is made in order to solve the above-mentioned problems, and it is therefore an object of the present invention to provide a color correction apparatus and a color correction method capable of providing a color-corrected image having a high degree of color reproducibility by preventing any chromaticity range which is not contained in a color reproduction region reproducible by a color image display apparatus through color adjustment from being produced by performing color gamut compression processing based on the color reproduction characteristics of the color image display apparatus, and achieving improvements in the processing speed without having to use a three dimension LUT for the color gamut compression processing.

DISCLOSURE OF THE INVENTION

A color correction apparatus in accordance with the present invention includes: a color correction means for making a color correction to an input image signal; and a color gamut compression means for performing color gamut compression on the color-corrected input image signal based on data describing color reproduction characteristics so that the color-corrected image data outputted from the color correction means has a chromaticity range which is contained in a color reproduction region which is based on the color reproduction characteristics.

Therefore, the present invention offers an advantage of being able to carry out color correction according to the color reproduction characteristics of an individual color image display apparatus, and to acquire an output image signal which can be smoothly color-reproduced.

A color correction method in accordance with the present invention includes: a step of converting a hue indicated by image data using a hue conversion means; a step of converting a value indicated by the image data acquired from the hue conversion means using a value conversion means; a step of converting a saturation indicated by the image data acquired from the value conversion means based on color reproduction characteristics data describing color reproduction characteristics of a color image display apparatus using a saturation conversion means; and a step of carrying out color gamut compression so that the image data acquired from the saturation conversion means has a chromaticity range which is contained in a color reproduction region which is based on the color reproduction characteristics using a color gamut compression means.

Therefore, the present invention offers an advantage of being able to carry out three-dimensional color correction with a high degree of flexibility in a color space.

PREFERRED EMBODIMENTS OF THE INVENTION

In order to explain the invention in greater detail, the preferred embodiments of the invention will be explained below with reference to the accompanying figures.

Embodiment 1

Figure 1:
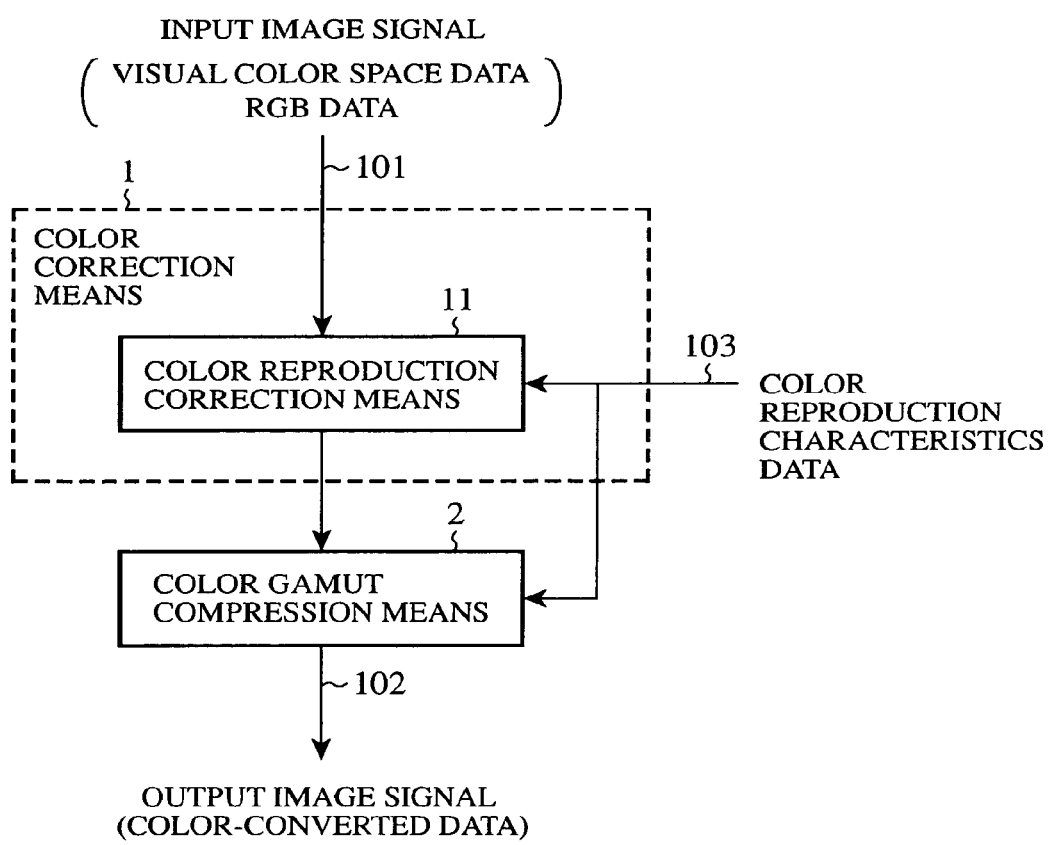
FIG. 1 is a block diagram showing the structure of the color correction apparatus in accordance with embodiment 1 of the present invention.

FIG. 1 is a block diagram showing the structure of a color correction apparatus in accordance with embodiment 1 of the present invention. The illustrated color correction apparatus is provided with a color correction means 1 for accepting an input image signal 101 to be color-corrected, and a color gamut compression means 2 for performing color gamut compression on the color-corrected image data outputted from the color correction means 1.

The input image signal 101 includes visual color space data indicating an arbitrary chromaticity range and RGB data.

The color correction means 1 is provided with a color reproduction correction means 11 for making a correction to the certain chromaticity range indicated by the input image signal 101 based on color reproduction characteristics data 103.

Next, the operation of the color correction apparatus in accordance with this embodiment of the present invention will be explained.

The color reproduction correction means 11 which constitutes the color correction means 1 accepts the input image signal 101, performs a predetermined operation using the RGB data which constitutes the input image signal 101, and calculates a hue number and a hue value of the chromaticity range indicated by the input image signal 110. The color reproduction correction means 11 then performs a process of making a correction to the chromaticity range indicated by the above-mentioned hue number and hue value based on both the visual color space data of the input image signal 101, and the color reproduction characteristics data 103 describing the color reproduction characteristics of a color image display apparatus and target color reproduction characteristics, and outputs the corrected visual color space data.

The color gamut compression means 2 acquires a color reproduction region for the color image display apparatus and a target color reproduction region in a color space from the corrected visual color space data based on the color reproduction characteristics data 103. The color gamut compression means 2 then compresses the target color reproduction region in the color space toward the color reproduction region for the color image display apparatus, and performs color gamut compression on the corrected visual color space data so that the corrected visual color space data can be reproduced with chromaticity ranges within the color reproduction region for the color image display apparatus.

The color gamut compression means 2 performs color gamut compression on the corrected visual color space data outputted from the color reproduction correction means 11 based on the color reproduction characteristics data 103 in this way, and outputs this visual color space data as an output image signal 102.

Next, the operation of the color reproduction correction means 11 will be explained in detail.

The color reproduction correction means 11 accepts the input image signal 101 and determines the hue number and hue value of the input image signal 101 using the RGB data which constitutes this input image signal 101 by performing processing as will be explained below.

The color reproduction correction means 11 compares an R signal, a G signal, and a B signal which are described in the RGB data of the input image signal 101 with one another first so as to determine a maximum, an intermediate value, and a minimum of these signals through arithmetic operations.

For example, when the R signal is a maximum of these signals, the G signal is an intermediate value of these signals, and the B signal is a minimum of these signals, the RGB data indicates a red to yellow color region and the hue number of this color region is set to 0. When the G signal is a maximum of these signals, the R signal is an intermediate value of these signals, and the B signal is a minimum of these signals, the RGB data indicates a yellow to green color region and the hue number of this color region is set to 1. When the G signal is a maximum of these signals, the B signal is an intermediate value of these signals, and the R signal is a minimum of these signals, the RGB data indicates a green to cyan color region and the hue number of this color region is set to 2. When the B signal is a maximum of these signals, the G signal is an intermediate value of these signals, and the R signal is a minimum of these signals, the RGB data indicates a cyan to blue color region and the hue number of this color region is set to 3. When the B signal is a maximum of these signals, the R signal is an intermediate value of these signals, and the G signal is a minimum of these signals, the RGB data indicates a blue to magenta color region and the hue number of this color region is set to 4. When the R signal is a maximum of these signals, the B signal is an intermediate value of these signals, and the G signal is a minimum of these signals, the RGB data indicates a magenta to red color region and the hue number of this color region is set to 5.

Then, when the R signal is a maximum of these signals, the G signal is an intermediate value of these signals, and the B signal is a minimum of these signals, for example, the color reproduction correction means subtracts the minimum value from the maximum value (i.e., the R signal−the B signal), and subtracts the minimum value from the intermediate value (i.e., the G signal−the B signal).

An upper limit which can be expressed by the number of bits which constitute the RGB data of the input image signal 101 is referred to as a bit maximum of the RGB data, and an upper limit which can be expressed by the number of bits which constitute arbitrary data is referred to as a bit maximum of the data.

The color reproduction correction means multiplies the value of (the G signal−the B signal) by (the bit maximum of the RGB data/the value of (the R signal−the B signal)), which is provided as a coefficient, and then divides the resultant value calculated through this multiplication by the bit maximum of the RGB data of the input image signal 101.

A quotient which is thus calculated through this division is related with a predetermined color region which is based on the relationship in value among the R signal, the G signal, and the B signal.

The color reproduction correction means then adds a hue number associated with a color region which is the same as that for the above-mentioned quotient, the hue number being included in the plurality of hue numbers which are respectively associated with the plurality of above-mentioned color regions, to the quotient, and defines the addition result as the hue number of the input image signal 101. The color reproduction correction means also defines the remainder which is obtained when acquiring the above-mentioned quotient as the hue value of the input image signal 101.

Next, a hue number and a hue value which are used when identifying each data indicating a chromaticity range based on the hue of each data during the processing of the color correction apparatus of the present invention will be explained by taking those in a YCbCr color space as an example.

Figure 2:
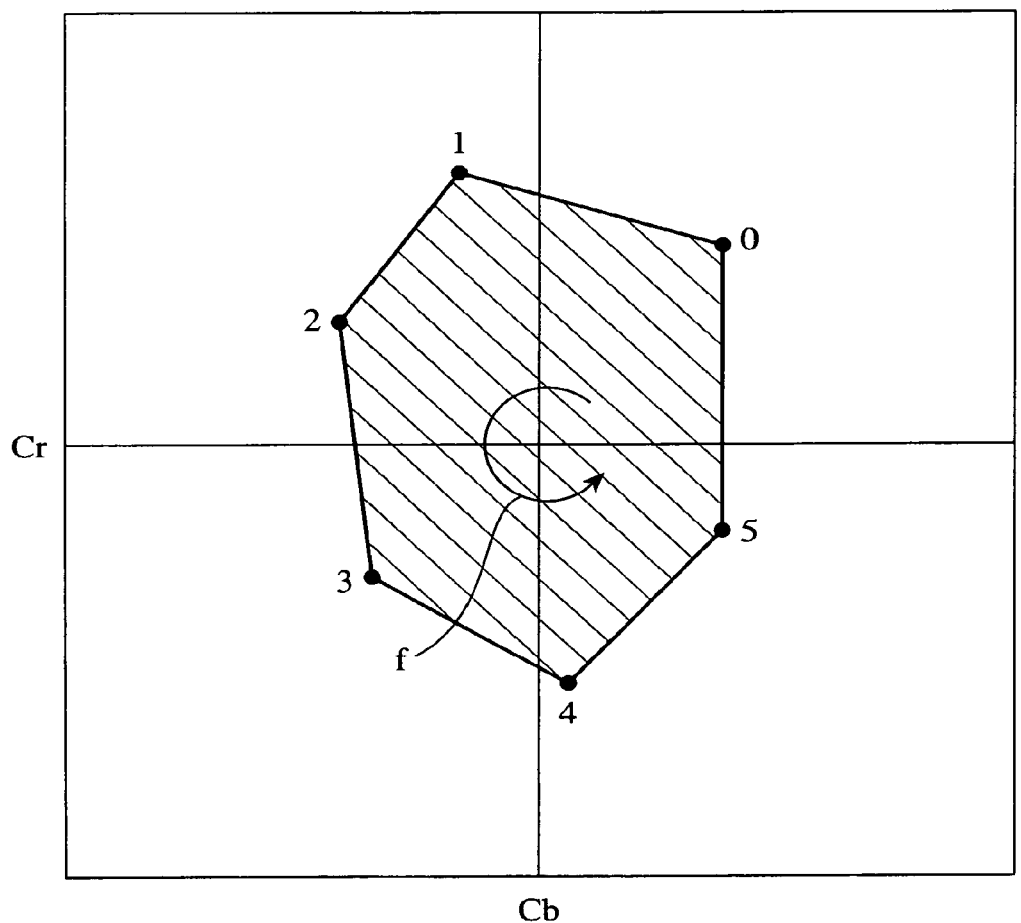
FIG. 2 is a diagram showing an example of setting of a hue number and a hue value.

FIG. 2 is a diagram showing an example of setting of a hue number and a hue value for the input image signal. A hatched region shown in the figure shows a chromaticity range in a CbCr plane among chromaticity ranges which can exist in the YCbCr color space. In the CbCr plane, the chromaticity range is substantially shaped like a hexagon, as illustrated in the figure. Hues which constitute this chromaticity range are annularly arranged and expressed, as shown by an arrow f in the figure.

Then, hue numbers 0 to 5 are set to the six vertices of the hexagon indicating the chromaticity range, respectively. Furthermore, when a hue value showing a position between any two adjacent hue numbers is set so that a predetermined position between the hue number 0 and the hue number 1 can be pinpointed, for example, any one of all the hues that form the hue circle can be specified by a hue number and a hue value.

The hue numbers explained above are set so that they are respectively associated with the six vertices of the hexagon indicating the chromaticity range in the CbCr plane. As an alternative, hue numbers can be set to at least the three primary colors for use in the color image display apparatus, respectively, hue numbers can be also set to either chromaticity ranges which are complementary colors of the three primary colors or chromaticity ranges extracted at random from the color reproduction region for the color image display apparatus, respectively, and the contents of the color reproduction characteristics data 3, which will be mentioned later, can be described so that they are associated with these hue numbers.

As explained until now, after processing the input image signal 101 and calculating the hue number and hue value of the input image signal 101, the color reproduction correction means 11 acquires the color reproduction characteristics data 103 which has been preset by the user. The color reproduction correction means 11 then performs a correction operation on the chromaticity range indicated by the input image signal 101 using both visual color reproduction data describing the color reproduction characteristics of the color image display apparatus described in the color reproduction characteristics data 103, and visual color space data describing the target color reproduction characteristics. For example, the visual color space data describing the target color reproduction characteristics can be data indicating the characteristics of a reference color space which complies with standards, such as NTSC or sRGB standards, or data indicating the color reproduction characteristics of a transparency image or a print image generated by the color image display apparatus.

Figures 3, 4:
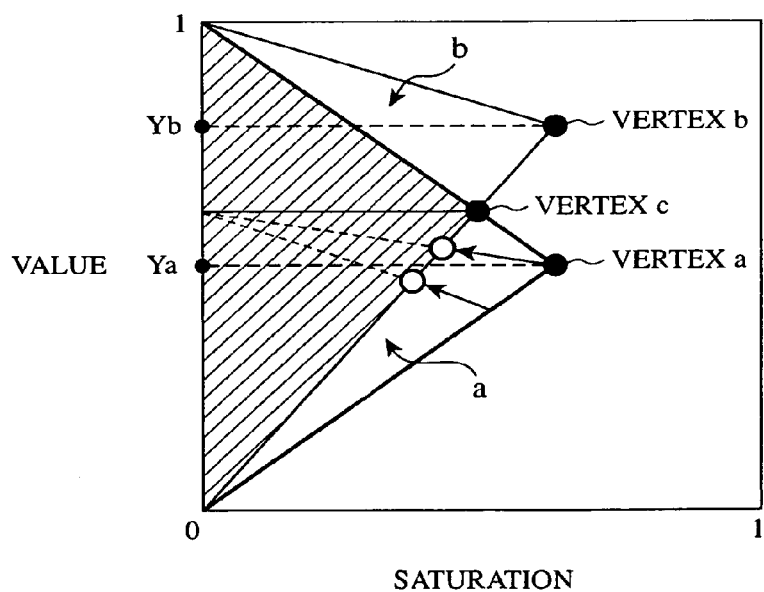
FIG. 3 is a diagram showing the structure of color reproduction characteristics data for use in the color correction apparatus in accordance with embodiment 1.
FIG. 4 is a diagram showing an example of compression processing carried out by a color gamut compression means in accordance with embodiment 1.

FIG. 3 is a diagram showing the structure of the color reproduction characteristics data for use with the color correction apparatus in accordance with embodiment 1.

The color reproduction characteristics data 103 include the visual color space data indicating the color reproduction characteristics of the color image display apparatus and the visual color space data indicating the target color reproduction characteristics which are described therein while those visual color space data are brought into correspondence with each of the plurality of hue numbers, as mentioned above. In detail, the color reproduction characteristics data describe both a chromaticity range indicating the color reproduction characteristics of the color image display apparatus and a chromaticity range indicating the target color reproduction characteristics for a certain hue shown by each of the plurality of hue numbers. To be more specific, the visual color space data indicating the color reproduction characteristics of the color image display apparatus and the visual color space data indicating the target color reproduction characteristics describe values indicating chromaticity ranges in, for example, the YCbCr color space.

The color reproduction correction means 11 uses the color reproduction characteristics data 103 illustrated in FIG. 3 in such a way as mentioned below. For example, the color reproduction correction means 11 refers to the color reproduction characteristics of the color image display apparatus corresponding to the hue number acquired from the RGB data of the input image signal 101. The color reproduction characteristics of the color image display apparatus referred by the color reproduction correction means 11 is referred to as the color characteristics a from here on. The color reproduction correction means 11 then adds 1 to the hue number acquired from the RGB data of the input image signal 101, and refers to the color reproduction characteristics of the color image display apparatus corresponding to the hue number. The color reproduction characteristics of the color image display apparatus referred by the color reproduction correction means 11 is referred to as the color characteristics b from here on. Since the color reproduction characteristics data 103 represent the chromaticity range indicating each color reproduction characteristics with each value included in the visual color space data, as mentioned above, the data values described as the color characteristics a and b also represent predetermined chromaticity ranges, respectively.

The color reproduction correction means 11 then performs processing which will be explained below in order to bring the chromaticity range indicated by the input image signal 101 into correspondence with the contents described in the color reproduction characteristics data 103. As can be seen from the above explanation, since each of the color characteristics a and the color characteristics b are described by corresponding visual color space data, when both the color characteristics a and the color characteristics b are handled as chromaticity range vectors, the visual color space data of the input image signal 101, which have the same hue number as the color characteristics a, lies at a position which is an internal point of division of a line segment shown by both the chromaticity range vector showing the color characteristics a and the chromaticity range vector showing the color characteristics b in the visual color space. Thus, since the visual color space data of the input image signal 101 corresponds to an internal point of division of a line segment shown by the color characteristics a and the color characteristics b, a ratio m related to the color characteristics a and a ratio n related to the color characteristics b, the ratios m and n being ratios of interior division, are acquired by assigning the value of the visual color space data of the input image signal 101, the value of the visual color space data of the color characteristics a, and the value of the visual color space data of the color characteristics b to predetermined simultaneous equations.

The color reproduction correction means then refers to the target color reproduction characteristics described in the color reproduction characteristics data 103, which correspond to the hue number of the input image signal 101. The target color reproduction characteristics referred by the color reproduction correction means are referred to as the color characteristics c. The color reproduction correction means then increments the hue number of the input image signal 101 by 1, and refers to target color reproduction characteristics which correspond to the hue number. The target color reproduction characteristics referred by the color reproduction correction means are referred to as the color characteristics d. Since the color reproduction characteristics data 103 represent the chromaticity range indicating each color reproduction characteristics with each value included in the visual color space data, as mentioned above, the data values described as the color characteristics c and d also represent predetermined chromaticity ranges, respectively.

The color reproduction correction means then multiplies the color characteristics c by the ratio m, multiplies the color characteristics d by the ratio n, and sums these products so as to generate corrected visual color space data based on those target color reproduction characteristics.

The color reproduction correction means 11 outputs the corrected visual color space data which have been acquired in this way.

Next, the operation of the color gamut compression means 2 will be explained in detail.

The color gamut compression means 2 is provided with a conversion means not shown, for converting visual color space data into RGB data, and furnishes the corrected visual color space data inputted from the color correction means 1 to the conversion means The conversion means performs a matrix or exponential operation depending on the color reproduction characteristics of the color image display apparatus on the corrected visual color space data furnished thereto so as to convert them into RGB data so as to acquire R1G1B1 data. This operation is related with a process of converting visual color space data indicating the color reproduction characteristics of the color image display apparatus into RGB data in contrast to a process of converting RGB data into visual color space data indicating the color reproduction characteristics of the color image display apparatus.

When the largest one of data values of the R1G1B1 data acquired by the conversion means exceeds the bit maximum of the R1G1B1 data, the color gamut compression means compresses the R1 data, G1 data, and B1 data which constitute the R1G1B1 data by calculating ratios, and then adjusts them so that any of those data does not exceed the bit maximum of the R1G1B1 data. The above-mentioned color reproduction correction means 11 processes the R1 data, G1 data, and B1 data of the R1G1B1 data, which it has adjusted in this way, by using the RGB data of the input image signal 101 in the same manner that the color correction apparatus carries out the process of acquiring the hue number and hue value of the input image signal 101 so as to determine the hue number (A) and hue value (A) of the visual color space data which has been corrected based on the color reproduction characteristics of the color image display apparatus.

The color gamut compression means 2 then acquires both a chromaticity range indicating the color reproduction characteristics of the color image display apparatus which correspond to the hue number (A), and a chromaticity range indicating the color reproduction characteristics of the color image display apparatus which correspond to the hue number (A+1) which is the sum of 1 and the hue number (A) with reference to the color reproduction characteristics of the color image display apparatus represented by the color reproduction characteristics data 103.

The color gamut compression means defines the chromaticity range shown by the hue number (A) as a vector a and also defines the chromaticity range shown by the hue number (A+1) as a vector b, handles them as chromaticity range vectors, respectively, and acquires the sum of these vectors. When the sum of the vectors a and b is defined as a vector ab, the hue value (A) divides the vector ab interiorly. This is because the hue value (A) corresponds to a value showing a distance from the vector a showing the chromaticity range of the hue number (A) to the vector b showing the chromaticity range of the hue number (A+1).

Thus, since the color gamut compression means can pinpoint a position indicated by the hue value (A) on the vector ab, it acquires ratios of interior division from the hue value (A) which is an internal point of division of a line segment between the vectors a and b, for example, a ratio mA related to the vector a and a ratio nA related to the vector b.

After that, the color gamut compression means multiplies the chromaticity range indicating the color reproduction characteristics of the color image display apparatus which correspond to the hue number (A), which it has acquired with reference to the color reproduction characteristics data 103, by the ratio mA. The color gamut compression means also multiplies the chromaticity range indicating the color reproduction characteristics of the color image display apparatus which correspond to the hue number (A+1), which it has acquired with reference to the color reproduction characteristics data 103, by the ratio nA. The color gamut compression means sums these products so as to acquire a chromaticity range (A) indicating the color reproduction characteristics of the color image display apparatus which correspond to the hue shown by the hue number (A) and the hue value (A). This chromaticity range (A) corresponds to a vertex b which will be mentioned below.

The color gamut compression means 2 then performs a matrix or exponential operation depending on the target color reproduction characteristics on the visual color space data which has been corrected by using the conversion means so as to convert the corrected visual color space data into RGB data, and then acquires R2G2B2 data. This operation is related with a process of converting visual color space data indicating target color reproduction characteristics into RGB data in contrast to a process of converting RGB data into visual color space data indicating target color reproduction characteristics.

The color gamut compression means 2 holds the corrected visual color space data which it has accepted from the color reproduction correction means 11 even after converting the corrected visual color space data into the R1G1B1 data and the R2G2B2 data by using the conversion means.

When the largest one of the data values contained in the R2G2B2 data exceeds the bit maximum of the R2G2B2 data which are thus obtained, the color gamut compression means 2 then compresses the R2 data, G2 data, and B2 data which constitute the R2G2B2 data by performing arithmetic operations using ratios, and adjusts them so that any of those data does not exceed the bit maximum of the R2G2B2 data. The above-mentioned color reproduction correction means 11 processes the R2 data, G2 data, and B2 data of the R2G2B2 data, which it has adjusted in this way, by using the RGB data of the input image signal 101 in the same manner that the color correction apparatus carries out the process of acquiring the hue number and hue value of the input image signal 101 so as to determine the hue number (B) and hue value (B) of the visual color space data which has been corrected based on the target color reproduction characteristics.

The color gamut compression means 2 then refers to the target color reproduction characteristics contained in the color reproduction characteristics data 103 so as to acquire both a chromaticity range indicating target color reproduction characteristics which correspond to the hue number (B) and a chromaticity range indicating target color reproduction characteristics which correspond to the hue number (B+1) which is the sum of 1 and the hue number (B).

The color gamut compression means 2 handles the chromaticity range of the hue number (B) and the chromaticity range of the hue number (B+1) as chromaticity range vectors in the same manner that it handles the chromaticity range of the above-mentioned hue number (A) and that of the above-mentioned hue number (A+1), acquires ratios of interior division from the hue value (B) which is an internal point of division of a line segment between the chromaticity range vector associated with the hue number (B) and the chromaticity range vector associated with the hue number (B+1), for example, a ratio mB related to the chromaticity range vector associated with the hue number (B) and a ratio nB related to the chromaticity range vector associated with the hue number (B+1) in the same manner that it acquires the ratios of interior division from the hue value (A) which is an internal point of division of a line segment between the chromaticity range vector associated with the hue number (A) and the chromaticity range vector associated with the hue number (A+1).

After that, the color gamut compression means multiplies the chromaticity range indicating the target color reproduction characteristics which correspond to the hue number (B), which it has acquired with reference to the color reproduction characteristics data 103, by the ratio mB. The color gamut compression means also multiplies the chromaticity range indicating the target color reproduction characteristics which correspond to the hue number (B+1), which it has acquired with reference to the color reproduction characteristics data 103, by the ratio nB. The color gamut compression means then sums these products so as to acquire a chromaticity range (B) indicating the target color reproduction characteristics which correspond to the hue shown by the hue number (B) and the hue value (B). This chromaticity range (B) corresponds to a vertex a which will be mentioned below.

After thus acquiring the chromaticity range (A) indicating the color reproduction characteristics of the color image display apparatus and corresponding to the hue shown by both the hue number (A) and the hue value (A), and the chromaticity range (B) indicating the target color reproduction characteristics and corresponding to the hue shown by both the hue number (B) and the hue value (B), the color gamut compression means 2 carries out color gamut compression by using a color reproduction region which is indicated by the chromaticity range (A), i.e., the vertex b and which is based on the color reproduction characteristics of the color image display apparatus, and a color reproduction region which is indicated by the chromaticity range (B), i.e., the vertex a and which is based on the target color reproduction characteristics. The color gamut compression means 2 carries out this color gamut compression so that the vertex a indicating the color reproduction region for the target color reproduction characteristics is included within the color reproduction region for the color reproduction characteristics of the color image display apparatus.

FIG. 4 is a diagram showing the compression processing carried out by the color gamut compression means in accordance with embodiment 1. The horizontal axis of FIG. 4 shows saturation and the vertical axis shows value. For example, when the visual color space data used for representation of the chromaticity ranges (A) and (B) are data in the YCbCr color space, the vertical axis of FIG. 4 shows the value Y of the YCbCr color space data and shows a value which is normalized based on the bit maximum of the YCbCr color space data. The horizontal axis shows saturation defined in the CbCr plane, and this saturation is acquired as a distance from the point of origin in the CbCr plane, and shows a value which is normalized based on a maximum saturation which the YCbCr color space data can have.

The color gamut compression means 2 acquires the value and saturation of the chromaticity range (A) and those of the chromaticity range (B), which are represented by respective visual color space data, by performing the above-mentioned processing, for example. The color gamut compression means 2 defines the value and saturation of the chromaticity range (A), which it has acquired in this way, as the vertex b, as shown in FIG. 4, and also defines the value and saturation of the chromaticity range (B), which it has acquired in the same way that it has acquired the value and saturation of the chromaticity range (A), as the vertex a, as shown in FIG. 4.

When a triangle shown in FIG. 4 which is defined by the vertex a, and the certain coordinates (0, 0) and (0, 1) on the value axis is referred to as a triangle a, the triangle a indicates the color reproduction region which is based on the target color reproduction characteristics. When a triangle which is defined by the vertex b, and the certain coordinates (0, 0) and (0, 1) on the value axis is referred as a triangle b, the triangle b indicates the color reproduction region which is based on the color reproduction characteristics of the color image display apparatus.

When the color reproduction region which is based on the target color reproduction characteristics and the color reproduction region which is based on the color reproduction characteristics of the color image display apparatus are thus represented by the triangles a and b, respectively, the color gamut compression means 2 performs color gamut compression on the color reproduction region represented by the triangle a in such a way as mentioned below when the vertex b does not lie within the triangle a.

In contrast, when the vertex b lies within the color reproduction region represented by the triangle a, the color gamut compression means 2 does not carry out any color gamut compression, but outputs the corrected visual color space data which it has accepted from the color reproduction correction means 11 as an output image signal 102.

The color gamut compression means carries out the color gamut compression as shown in FIG. 4 so that the color reproduction region which is based on the target color reproduction characteristics is contained in the color reproduction region which is based on the color reproduction characteristics of the color image display apparatus by determining, as a vertex c, a point where the triangle a and the triangle b intersect between the vertex a and the vertex b, defining, as a convergence point, a point on the value axis having the same value as the vertex c, compressing the triangle a so that the vertex a is headed for the convergence point.

The above-mentioned color gamut compression is directed to a case where the following relationship: Yb>Ya is established between the values of the vertexes a and b shown in FIG. 4, where the values of the vertexes a and b are Ya and Yb, respectively. On the other hand, when the value of the vertex a is Yb and the value of the vertex b is Ya, i.e., when the value of the vertex a is higher than that of the vertex b, the color gamut compression means compresses the color reproduction region represented by the triangle a so that the vertex a is headed for the convergence point on the value axis having the same value as the vertex c.

By performing the compression processing, as shown in FIG. 4, the color correction apparatus makes the corrected visual color space data be contained in the target color reproduction region in the color space, and show the chromaticity range which is color-reproducible in the color image display apparatus.

Figure 5:
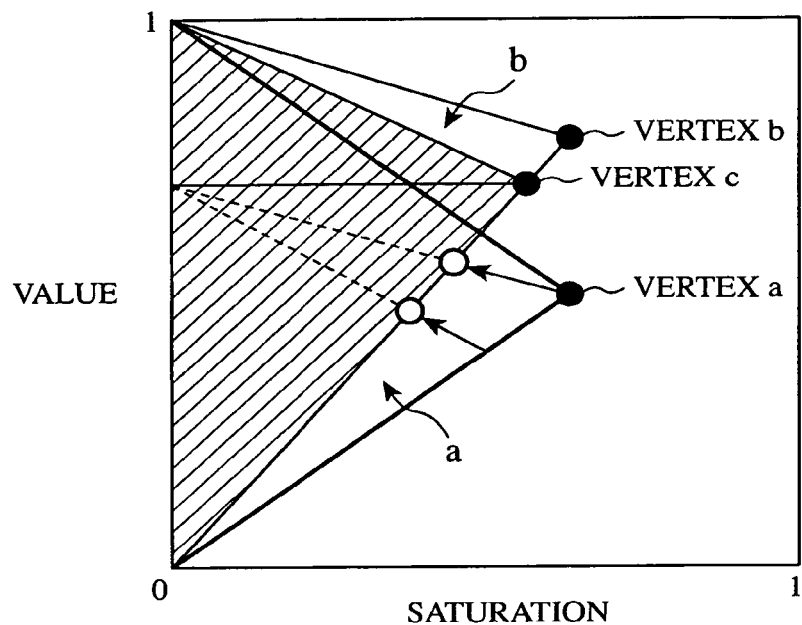
FIG. 5 is a diagram showing another example of the compression processing carried out by the color gamut compression means in accordance with embodiment 1.

FIG. 5 is a diagram showing another example of the compression processing carried out by the color gamut compression means in accordance with embodiment 1. In the color gamut compression already explained with reference to FIG. 4, the direction in which the color reproduction region represented by the triangle a is compressed is defined so that the vertex a is headed for the convergence point on the value axis having the same value as the vertex c, at which the triangle a including the vertex a and the triangle b including the vertex b intersect. In contrast, according to the other compression processing shown in FIG. 5, a vertex c having a value higher than that of a point at which the triangle a formed of the vertex a and the coordinates (0, 0) and (0, 1) on the value axis and the triangle b formed of the vertex b and the coordinates (0, 0) and (0, 1) on the value axis intersect is defined on a straight line which connects between a point at which the triangle a including the vertex a and the triangle b including the vertex b intersect and the vertex b, the direction in which the color reproduction region represented by the triangle a is compressed is defined so that the vertex a is headed for the convergence point on the value axis having the same value as the vertex c, and the color gamut compression is then carried out so that visual color space data having a higher value can be acquired.

When the vertex a has a higher value than the vertex b, a vertex c having a higher value than a point at which the triangle a including the vertex a and the triangle b including the vertex b intersect on a straight line which connects the vertex a and the coordinate (0, 0) can be alternatively defined, the direction in which the color reproduction region represented by the triangle a is compressed is defined so that the vertex a is headed for the convergence point on the value axis having the same value as the vertex c, and the color gamut compression is then carried out so that visual color space data having a higher value can be acquired.

Figure 6:
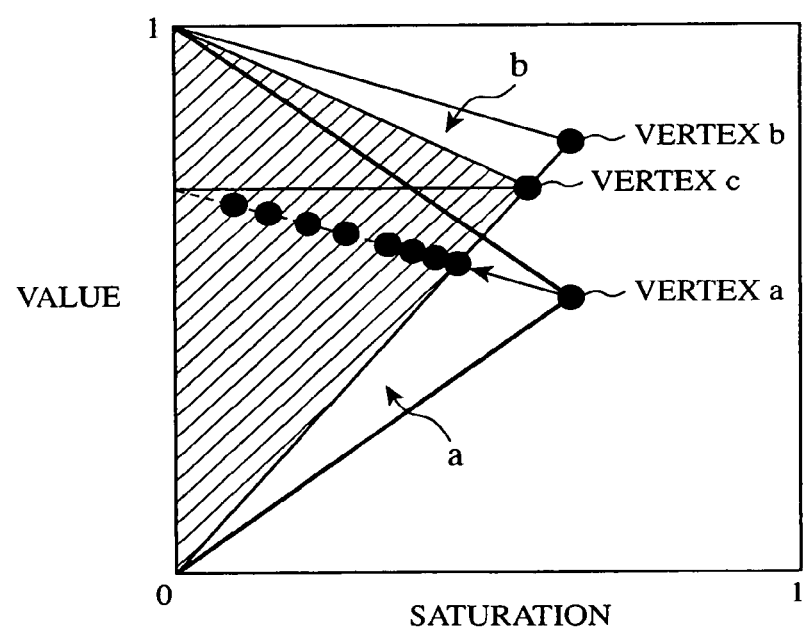
FIG. 6 is a diagram showing a further example of the compression processing carried out by the color gamut compression means in accordance with embodiment 1.

FIG. 6 is a diagram showing a further example of the compression processing carried out by the color gamut compression means in accordance with embodiment 1. When the vertex c having a higher value than the point at which the triangle a and the triangle b intersect on the straight line which connects the vertex b and the coordinate (0, 0) is defined, as shown in FIG. 5, the color gamut compression means can nonlinearly compress the color reproduction region represented by the triangle a by increasing a compression coefficient indicating the degree of compression with distance from the convergence point, as expressed by the intervals of two or more illustrated filled-in dots which are running from the vertex a of FIG. 6 toward the convergence point, so as to prevent the saturation of the whole of an image represented by the compressed visual color space data from falling.

Figure 7:
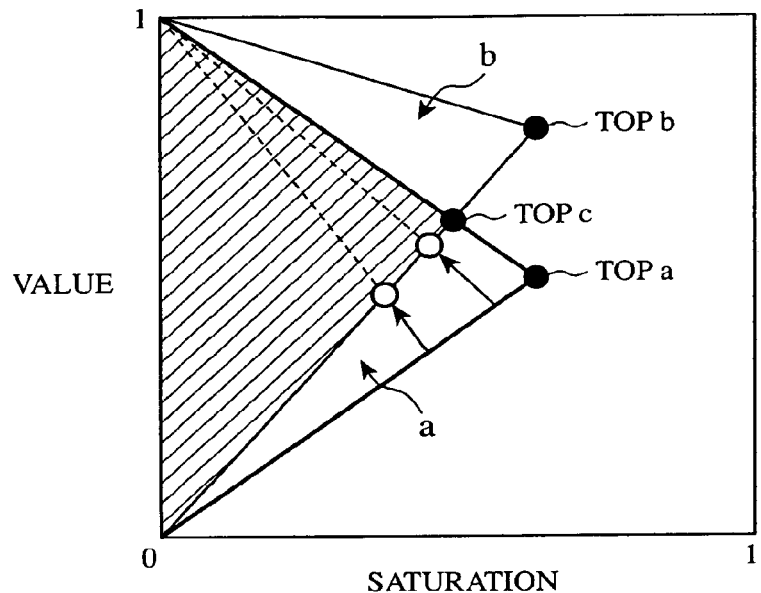
FIG. 7 is a diagram showing a still further example of the compression processing carried out by the color gamut compression means in accordance with embodiment 1.

FIG. 7 is a diagram showing another example of the compression processing carried out by the color gamut compression means in accordance with embodiment 1. In the color gamut compression explained with reference to FIG. 4, the direction in which the color reproduction region represented by the triangle a is compressed is defined so that the vertex a is headed for the convergence point on the value axis having the same value as the vertex c at which the triangle a having the vertex a and the triangle b having the vertex b intersect. In contrast, in accordance with this example of the compression processing shown in FIG. 7, when the visual color space data on which the color gamut compression is to be performed has a low value, the direction in which the color reproduction region represented by the triangle a is compressed is defined so that the visual color space data has a higher value, for example, the vertex a is headed for the coordinate (0, 1), and the compression processing is carried out so that the value of the chromaticity range indicated by the visual color space data on which the correction processing has been performed can be raised. On the other hand, when the vertex a has a higher value than the vertex b, i.e., when the visual color space data on which the color gamut compression is to be performed has a high value, the color reproduction region represented by the triangle a is compressed so that the visual color space data has a lower value, for example, the vertex a is headed for the coordinate (0, 0), and the compression processing is carried out so that the value of the chromaticity range indicated by the visual color space data on which the correction processing has been performed can be lowered.

As mentioned above, in accordance with embodiment 1, the color reproduction correction means 11 determines the hue number and hue value of an input image signal 101 and generates corrected visual color space data, in which the chromaticity range of the input image signal 101 is corrected, by using color reproduction characteristics data 103 corresponding to the hue number and hue value of the input image signal 101, and the color gamut compression means 2 performs color gamut compression on the corrected visual color space data by using both a color reproduction region which is based on the color reproduction characteristics of the color image display apparatus and a color reproduction region which is based on target color reproduction characteristics according to the color reproduction characteristics data 103. Therefore the present embodiment offers an advantage of being able to acquire visual color space data which meets the target color reproduction characteristics.

Embodiment 2

Figure 8:
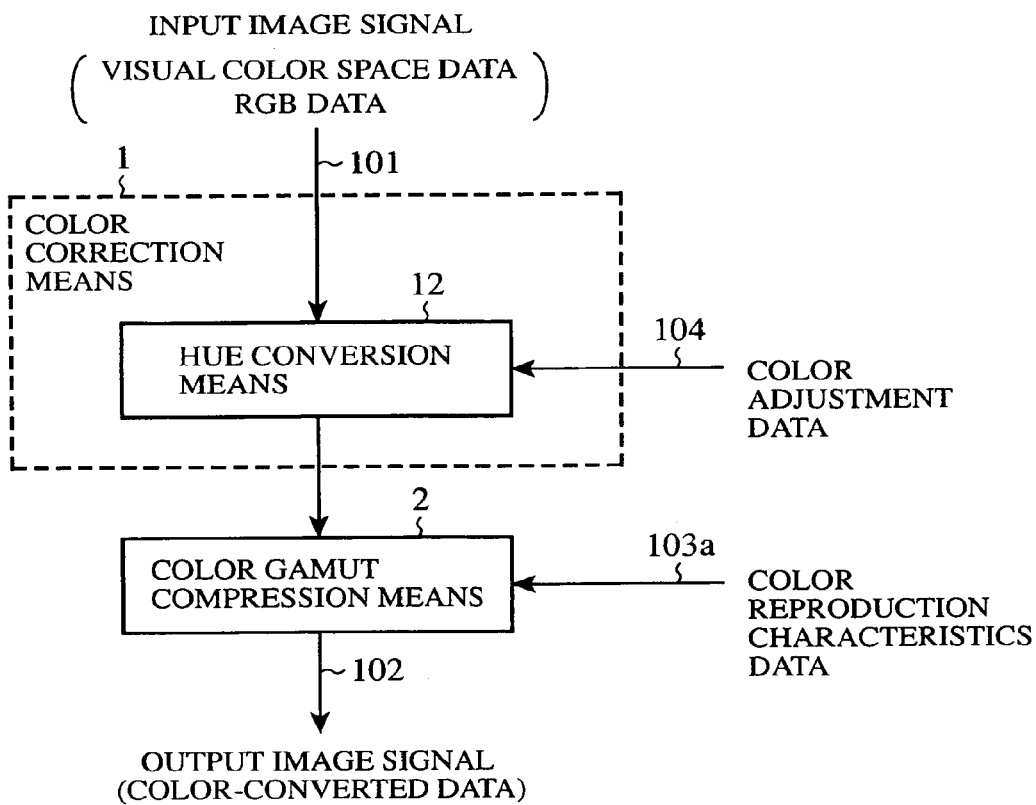
FIG. 8 is a block diagram showing the structure of a color correction apparatus in accordance with embodiment 2 of the present invention.

FIG. 8 is a block diagram showing the structure of a color correction apparatus in accordance with embodiment 2 of the present invention. The illustrated color correction apparatus is provided with a color correction means 1 for accepting an input image signal 101 and a color gamut compression means 2 for performing color gamut compression on image data outputted from the color correction means 1.

The input image signal 101 shown in FIG. 8 includes both visual color space data indicating an arbitrary chromaticity range and RGB data. The color correction means 1 shown in FIG. 8 is provided with a hue conversion means 12 for converting a hue indicated by the visual color space data of the input image signal 101.

Next, the operation of the color correction apparatus in accordance with this embodiment of the present invention will be explained.

The color correction means 1 shown in FIG. 8 accepts the input image signal 101 including the visual color space data indicating a chromaticity range in, for example, an XYZ color space, an L*a*b* uniform color space, a YUV color space, a YCbCr color space, or the like, and RGB data indicating the same chromaticity range as that indicated by the visual color space data with the values of an R signal, a G signal, and a B signal contained therein.

The hue conversion means 12 of the color correction means 1 accepts the visual color space data and RGB data of the input image signal 101, performs the same predetermined operation as that done by the color reproduction correction means 11, which is explained in Embodiment 1, using the RGB data, and determines the hue number and hue value of the input image signal 101. The hue conversion means 12 then performs hue conversion on the visual color space data of the input image signal 101 based on color adjustment data 104 inputted thereto from outside the color correction apparatus so as to calculate the hue number and hue value of the hue-converted visual color space data.

The hue conversion means 12 thus acquires the hue number and hue value of the input image signal and the hue number and hue value of the hue-converted input image signal, and then outputs the hue number and hue value of the yet-to-be-hue-converted input image signal, the hue number and hue value of the hue-converted input image signal, and the hue-converted visual color space data to the color gamut compression means 2.

The color gamut compression means 2 in accordance with embodiment 2 calculates a color reproduction region for the yet-to-be-converted hue from the hue number and hue value of the yet-to-be-hue-converted input image signal based on color reproduction characteristics data 103a. The color gamut compression means 2 then determines a color reproduction region for the converted hue from the hue number and hue value of the hue-converted input image based on the color reproduction characteristics data 103a. The color gamut compression means 2 further performs color gamut compression on the hue-converted visual color space data so that the color reproduction region for the yet-to-be-converted hue is headed for the color reproduction region for the converted hue.

The color gamut compression means 2 thus performs the color gamut compression on the hue-converted visual color space data based on the color reproduction characteristics data 103a so that the chromaticity range indicated by the hue-converted visual color space data is contained in the color reproduction region for the converted hue and then outputs the visual color space data on which this color gamut compression is performed as an output image signal 102.

Next, the operation of the hue conversion means 12 will be explained in detail.

The hue conversion means 12 performs arithmetic processing on the R signal, the G signal, and the B signal which form the accepted RGB data of the input image signal 101, in the same way that the color reproduction correction means 11 does as explained in Embodiment 1, so as to determine the hue number and hue value of the input image signal 101, i.e., the yet-to-be-hue-converted hue number and hue value of the input image signal 101.

The hue conversion means 12 then acquires color adjustment data 104 from outside the color correction apparatus, and performs hue conversion on the visual color space data of the input image signal 101. This color adjustment data 104 is the one in which a hue to be adjusted and an amount of adjustment which are preset according to the user's liking are described. To be more specific, the amount of adjustment for the value of a hue to be adjusted and the amount of adjustment for the values of hues in the vicinity of the hue to be adjusted are described in the color adjustment data.

The hue conversion means 12 compares the hue indicated by the visual color space data of the input image signal 101 with the hue indicated by the color adjustment data 104, and, when determining that they match with each other, adds the amount of adjustment for the hue value described by the color adjustment data 104 to the previously-determined hue value of the input image signal 101, i.e., the yet-to-be-hue-converted hue value so as to determine a hue-converted hue value. As previously explained, since the color adjustment data 104 indicates a certain hue to be adjusted, but the amount of adjustment for hues in the vicinity of the hue to be adjusted is also described in the color adjustment data 104, even when the hue indicated by the visual color space data of the input image signal 101 is the one in the vicinity of the hue to be adjusted, the color conversion this partner means 12 performs the same processing as that as mentioned above on the hue described in the color adjustment data 104, so as to carry out predetermined hue adjustment.

For example, when the color adjustment data 104 indicates a hue to be hue-converted and also describes the amount of adjustment numerically, the hue conversion means determines the hue-converted hue number and hue value of the input image signal according to the following procedure. The hue conversion means adds a numeric value indicating the amount of adjustment to the yet-to-be-hue-converted hue value so as to determine an adjusted hue value (C) first.

When the adjusted hue value (C) is larger than the bit maximum of the input image signal 101, the hue conversion means adds 1 to the yet-to-be-hue-converted hue number and then defines the addition result as a hue-converted hue number. The hue conversion means further subtracts the bit maximum of the input image signal 101 from the adjusted hue value (C) and then defines the subtraction result as a hue-corrected hue value. In contrast, when the bit maximum of the input image signal 101 is equal to or smaller than the adjusted hue value (C), the hue conversion means defines the yet-to-be-hue-converted hue number as the hue-converted hue number and then defines the adjusted hue value (C) as the hue-converted hue value.

The hue conversion means 12 outputs the yet-to-be-hue-converted visual color space data having the yet-to-be-hue-converted hue number and hue value of the input image signal which it has determined as mentioned above, and the hue-converted visual color space data having the hue-converted hue number and hue value of the input image signal to the color gamut compression means 2.

The color adjustment data 104 inputted thereto from outside the color correction apparatus are inputted into the hue conversion means 12 by way of a user interface not shown. For example, this user interface can be disposed in the color correction apparatus and can be connected with an external input means not shown. When the color correction apparatus of this embodiment is so constructed, the color adjustment data 104 is represented in the form of physical quantities into which the hue to be corrected and the amount of adjustment which the user has set by operating the input means are converted.

The hue conversion means 12 can be provided with a hue look-up table (a look-up table is referred to as an LUT from here on), and can perform hue conversion on the visual color space data of the input image signal 101 with reference to this hue LUT. In the hue LUT for use with the hue conversion means, the amount of adjustment is provided for each of all hues.

Figures 9, 10:
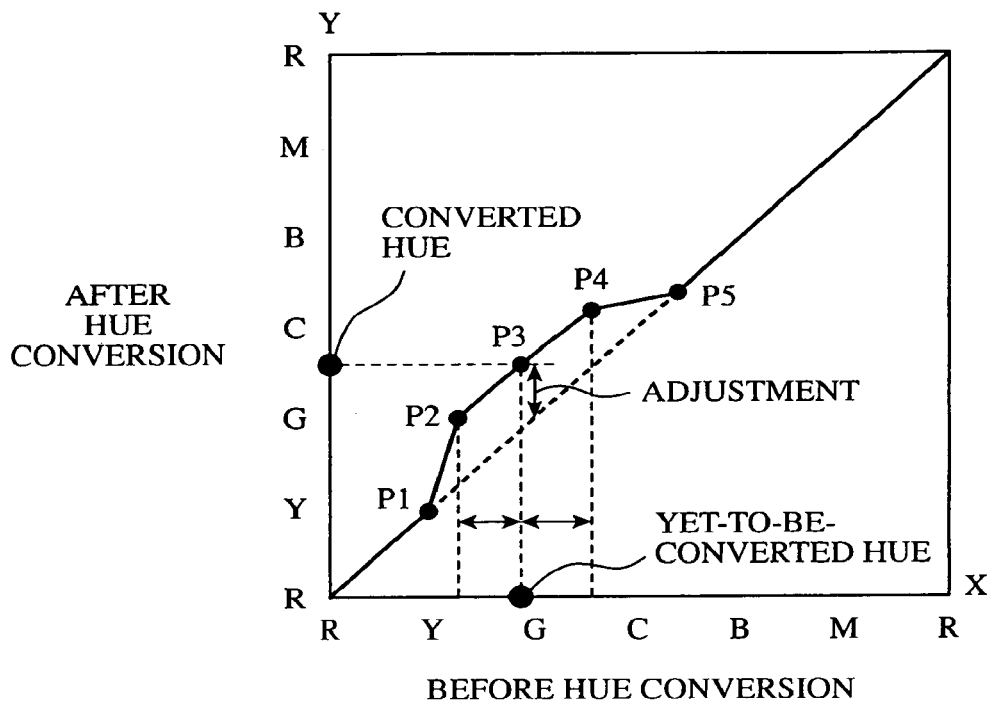
FIG. 9 is a diagram showing the hue conversion characteristics of a hue LUT.
FIG. 10 is a diagram showing the structure of color reproduction characteristics data for use in the color correction apparatus in accordance with embodiment 2.

FIG. 9 is a diagram showing the hue conversion characteristics of the hue LUT. The illustrated hue conversion characteristics are an example in which the amount of adjustment for each of all hues is taken into consideration so that, when converting a desired hue, smooth color adjustment can be performed and a hue in the vicinity of the desired hue can be also converted properly.

The horizontal axis X of FIG. 9 shows the yet-to-be-hue-converted hue. Each of hues such as R (red), Y (yellow), G (green), C (cyan), B (blue), M (magenta), and R (red) which are defined on the horizontal axis X is based on the arrangement of the hue circle, and each of these hues and middle hues is represented by a hue value (D) which is determined through an arithmetic operation which will be mentioned later. The vertical axis Y shows the hue-converted hue. Each of hues of R (red), Y (yellow), G (green), C (cyan), B (blue), M (magenta), and R (red) which are defined on the vertical axis Y is based on the arrangement of the hue circle, and each of these hues and middle hues is represented by a hue value (E) which is determined through an arithmetic operation which will be mentioned later.

The hue value (D) and the hue value (E) are hue values as will be explained below. For example, when the interval between the hue number 1 and the hue number 2 is equally divided into 256 parts and each of these parts between the two hue numbers is expressed by one of hue values 0 to 255, a hue located between the hue number 1 and the hue number 2 can be also represented by (the hue number 1*256+a hue value (this hue value is either of the above-mentioned hue values 0 to 255)). In other words, each of the hue value (D) and the hue value (E) can specify any of all hues by using only a hue value without having to use any hue number. When the horizontal axis X and vertical axis Y of FIG. 9 are represented numerically, each axis expresses a value which falls within a range of 0 to 1536. In this example shown, although the hue value is expressed in the form of 8 bits (256 levels), the number of bits indicating the hue value is not limited to 8 bits. In this case, the range of hue values on each axis is determined based on the number of levels corresponding to the number of bits.

When the hue LUT does not have any amount of adjustment for each hue, it becomes an LUT having linear characteristics in which the relationship between the yet-to-be-hue-converted hue and the hue-converted hue is expressed by a straight line including a dashed line connecting a point P1 with a point P5 and extension lines, as shown in FIG. 9.

When the hue LUT has an amount of adjustment for each hue, the amount of adjustment is taken into consideration as will be explained below. For example, a predetermined amount of adjustment is added to an Y coordinate value on the straight line defined by the linear characteristics, which corresponds to the yet-to-be-converted hue on the X-axis of FIG. 9. A point P3 having an Y coordinate value which is equal to the sum of the predetermined amount of adjustment and the Y coordinate value on the straight line corresponding to the yet-to-be-converted hue is then defined. The point P3 has the same X coordinate value as the yet-to-be-converted hue shown in the figure.

While the following relationships: (the amount of adjustment*T)<=(X3−X2)<=(the amount of adjustment*2) and (the amount of adjustment/T)<=(X4−X3)<=(the amount of adjustment*2) are established, two points P2 and point P4 are defined so that the relationship between the yet-to-be-hue-converted hue and the hue-converted hue is linearly expressed in a range between the points P2 and P4, where T is a coefficient equal to or smaller than 2, X3 is the X coordinate value of the point P3, X2 is the X coordinate value of the point P2, and X4 is the X coordinate value of the point P4.

The point P1 is located on the straight line defined by the linear characteristics so that (X2−X1) becomes equal to (the amount of adjustment*T). A point P5 is located on the straight line defined by the linear characteristics so that a line which connects between the points P4 and P5 can have a "positive" gradient, and (X5−X4) becomes equal to (the amount of adjustment*T), where X1 is the X coordinate value of the point P1, and X5 is the X coordinate value of the point P5.

A characteristic curve which passes through the thus-defined points P1 to P5 shows hue conversion characteristics having an amount of adjustment for each hue. The hue LUT is thus defined so as to have the hue conversion characteristics. Among the points P1, P2, P3, P4, and P5 illustrated in FIG. 9, while the above-mentioned equations are established, the following relationship: (X3−X2)=(X4−X3) is also established.

When using the hue LUT as illustrated in FIG. 9 for hue conversion, the hue conversion means 12 multiplies the yet-to-be-hue-converted hue number by the bit maximum of the visual color space data of the input image signal 101, adds the yet-to-be-hue-converted hue value to the multiplication result so as to determine the hue value (D), and then refers to the hue LUT with this hue value (D). The hue conversion means 12 then divides the hue value (E) acquired with reference to the hue LUT by the bit maximum of the visual color space data of the input image signal 101, defines a value determined through this division as the hue-converted hue number, and also defines the remainder as the hue-converted hue value.

The hue conversion means 12 thus determines the hue-converted hue number and the hue value with reference to, for example, the hue LUT, so as to generate hue-converted visual color space data. Even when performing hue conversion using the hue LUT, the hue conversion means determines the hue number and hue value of the yet-to-be-hue-converted visual color space data by performing an arithmetic operation using the RGB data of the input image signal 101, as previously explained.

Next, the operation of the color gamut compression means 2 in accordance with embodiment 2 will be explained in detail.

The color gamut compression means 2 accepts both the yet-to-be-hue-converted visual color space data and the hue-converted visual color space data from the hue conversion means 12, and also accepts the color reproduction characteristics data 103*a* from outside the color correction apparatus.

FIG. 10 is a diagram showing the structure of the color reproduction characteristics data for use in the color correction apparatus in accordance with embodiment 2. This figure shows the structure of the color reproduction characteristics data 103*a*. Visual color space data indicating the color reproduction characteristics of the color image display apparatus is described in the color reproduction characteristics data 103*a* while it is brought into correspondence with each of a plurality of hue numbers. To be more specific, the color reproduction characteristics data 103*a* describes a chromaticity range indicating the color reproduction characteristics of the color image display apparatus for a certain hue expressed by each hue number. Concretely, the color reproduction characteristics of the color image display apparatus are described by visual color space data, for example, values indicating chromaticity ranges in a YCbCr color space.

The color gamut compression means then recognizes the yet-to-be-converted hue from the yet-to-be-hue-converted hue number and hue value of the input image signal, and then acquires a color reproduction region which is based on the color reproduction characteristics of the color image display apparatus corresponding to the yet-to-be-converted hue based on the color reproduction characteristics data 103*a*. The color gamut compression means then defines the yet-to-be-hue-converted hue number and hue value as a hue number (F) and a hue value (F), respectively. In the processing of acquiring a color reproduction region which is based on the color reproduction characteristics of the color image display apparatus corresponding to the yet-to-be-converted hue, the color gamut compression means acquires both a chromaticity range indicating the color reproduction characteristics of the color image display apparatus corresponding to the hue number (F) and a chromaticity range indicating the color reproduction characteristics of the color image display apparatus corresponding to the hue number (F+1) which is the sum of 1 and the hue number (F) first with reference to the color reproduction characteristics data 103*a*.

The color gamut compression means handles the chromaticity range of the hue number (F) and the chromaticity range of the hue number (F+1) as chromaticity range vectors, respectively, and then acquires a chromaticity range (F) indicating the color reproduction characteristics of the color image display apparatus corresponding to a hue indicated by the hue number (F) and the hue value (F) in the same manner that it carries out the process of acquiring the chromaticity range (A) indicating the color reproduction characteristics of the color image display apparatus corresponding to the hue indicated by the hue number (A) and the hue value (A), as previously described in the explanation of the operation of the color gamut compression means 2 in accordance with embodiment 1. This chromaticity range (F) corresponds to a vertex a shown in FIGS. 4 to 7.

The color gamut compression means 2 then recognizes the converted hue from the hue-converted hue number and hue value of the input image signal, and acquires a color reproduction region which is based on the color reproduction characteristics of the color image display apparatus corresponding to the converted hue based on the color reproduction characteristics data 103*a*. The color gamut compression means then defines the hue-converted hue number and hue value as a hue number (G) and a hue value (G), respectively. In the processing of acquiring a color reproduction region which is based on the color reproduction characteristics of the color image display apparatus corresponding to the converted hue, the color gamut compression means acquires both a chromaticity range indicating the color reproduction characteristics of the color image display apparatus corresponding to the hue number (G) and a chromaticity range indicating the color reproduction characteristics of the color image display apparatus corresponding to the hue number (G+1) which is the sum of 1 and the hue number (G) with reference to the color reproduction characteristics data 103*a*.

The color gamut compression means handles the chromaticity range of the hue number (G) and the chromaticity range of the hue number (G+1) as chromaticity range vectors, respectively, and then acquires a chromaticity range (G) indicating the color reproduction characteristics of the color image display apparatus corresponding to a hue indicated by the hue number (G) and the hue value (G) in the same manner that it carries out the process of acquiring the chromaticity range (F) indicating the color reproduction characteristics of the color image display apparatus corresponding to the hue indicated by the hue number (F) and the hue value (F), as previously explained. This chromaticity range (G) corresponds to a vertex b shown in FIGS. 4 to 7.

After thus acquiring both the chromaticity range (F) indicating the color reproduction characteristics of the color image display apparatus corresponding to the yet-to-be-converted hue and the chromaticity range (G) indicating the color reproduction characteristics of the color image display apparatus corresponding to the converted hue, the color gamut compression means handles these chromaticity ranges (F) and (G) as the vertexes a and b, respectively, and then compresses the color reproduction region defined by a triangle a toward the color reproduction region defined by the triangle b so that the former color reproduction region is contained in the latter color reproduction region, as previously explained with reference to FIGS. 4 to 7, like the color gamut compression means 2 in accordance with embodiment 1. In other words, the color gamut compression means 2 in accordance with embodiment 2 compresses the color reproduction region which is based on the color reproduction characteristics of the color image display apparatus corresponding to the yet-to-be-converted hue toward the color reproduction region which is based on the color reproduction characteristics of the color image display apparatus corresponding to the converted hue.

By thus compressing the color reproduction region which is based on the color reproduction characteristics of the color image display apparatus corresponding to the yet-to-be-converted hue, the color gamut compression means makes the hue-converted visual color space data show a chromaticity range color-reproducible in the color image display apparatus.

When the image signal inputted into the color correction means 1 includes only RGB data, the color correction apparatus converts the RGB data into visual color space data expressed in one of the above-mentioned color spaces by using a color space conversion means disposed in the color correction means 1. This color space conversion means performs color space conversion processing, such as a matrix or exponential operation, on the RGB data so as to convert it into visual color space data. The visual color space data which is acquired in this way and the above-mentioned RGB data inputted into the color correction means 1 are inputted into the hue conversion means 12, and the hue conversion means 12 processes them as explained until now.

Even when the image signal inputted into the color correction means 1 has both visual color space data and RGB data, the color correction apparatus can convert the visual color space data inputted into the color correction means 1 into visual color space data which represents a chromaticity range more visually by using a color space conversion means disposed in the color correction means 1. This processing is, for example, the one of, when data expressed in an XYZ color space is inputted to the color correction means 1, converting the data expressed in the XYZ color space into data in a YCbCr color space by using the color space conversion means.

When thus having the color space conversion means, the color correction apparatus furnishes the RGB data to a processing means mentioned below, as well as the color space data on which color space conversion processing is performed which is the output of the color space conversion means.

As previously explained, the color adjustment data 104 is inputted into the hue conversion means 12 using the user interface. The user interface used at this time can be constructed as follows. For example, the user interface is connected with an input means provided with a display means and an operation means, as mentioned above, and has either an edit display function of making the user set a chromaticity range to be corrected with the chromaticity range's name or the like through the input means or an edit display function of displaying an image, such as a color chart, on the display means of the input means, making the user select a hue to be corrected from the image while making the user visually recognize the image, automatically determining and displaying the hue value of the RGB signal for this selected hue, and displaying a softswitch corresponding to a slider to which the amount of adjustment for the hue value is to be set and numeric values indicating possible amounts of adjustment for the hue value in the vicinity of the displayed slider. These displayed numeric values change according to a manipulated variable applied to the slider. The user interface can have a function of automatically adjusting the display of the slider when the user directly inputs the amount of adjustment for the hue value to an edit screen produced by the edit display function. The user interface can also display colors which are in the vicinity of the color which is selected by the user on a lower or upper side of the slider.

In the case of using the user interface, the color correction apparatus can make the user select desired color reproduction data from two or more color reproduction characteristics data prepared in advance by using the input means and can perform color gamut compression using the desired color reproduction characteristics data which the user has selected by using the color gamut compression means 2. When performing this processing, the color correction apparatus stores two or more types of color reproduction characteristics data in a predetermined storage means as a file of text or binary data, and makes the user operate the input means connected to the user interface so as to allow the user to select desired color reproduction characteristics data from the two or more types of color reproduction characteristics data stored in the predetermined storage means. The color gamut compression means 2 acquires the color reproduction characteristics data selected at this time from the storage means, and performs the color gamut compression as previously explained.

As mentioned above, according to the embodiment 2, the hue conversion means 12 converts the hue indicated by the visual color space data of an input image signal 101 based on the color adjustment data 104 inputted thereto from outside the color correction apparatus, and the color gamut compression means 2 compresses the color reproduction region for the yet-to-be-converted hue toward the color reproduction region for the converted hue based on different color reproduction characteristics data 103a in which the color reproduction characteristics of a color image display apparatus are described, and performs the color gamut compression so that a chromaticity range indicated by the visual color space data which has been hue-converted by the hue conversion means 12 is contained in the color reproduction region of the color image display apparatus. Therefore, the present embodiment offers an advantage of being able to perform the hue conversion according to the color reproduction characteristics of the individual color image display apparatus, and to provide an output image signal 102 which makes it possible for the color image display apparatus to carry out smooth color reproduction by performing the color gamut compression based on the color reproduction characteristics of the color image display apparatus.

In addition, the color gamut compression means 2 defines a chromaticity range indicating the color reproduction characteristics of the color image display apparatus corresponding to the yet-to-be-converted hue as a vertex a, also defines a chromaticity range indicating the color reproduction characteristics of the color image display apparatus corresponding to the converted hue as a vertex b, acquires a vertex c at which a color reproduction region defined by the vertex a and a color reproduction region defined by the vertex b intersect, and compresses the color reproduction region defined by the vertex a toward a convergence point on the value axis having the same value as the vertex c. Therefore, the present embodiment offers another advantage of being able to provide hue-converted visual color space data indicating a smoothly-reproducible image having little loss of value.

Embodiment 3

Figure 11:
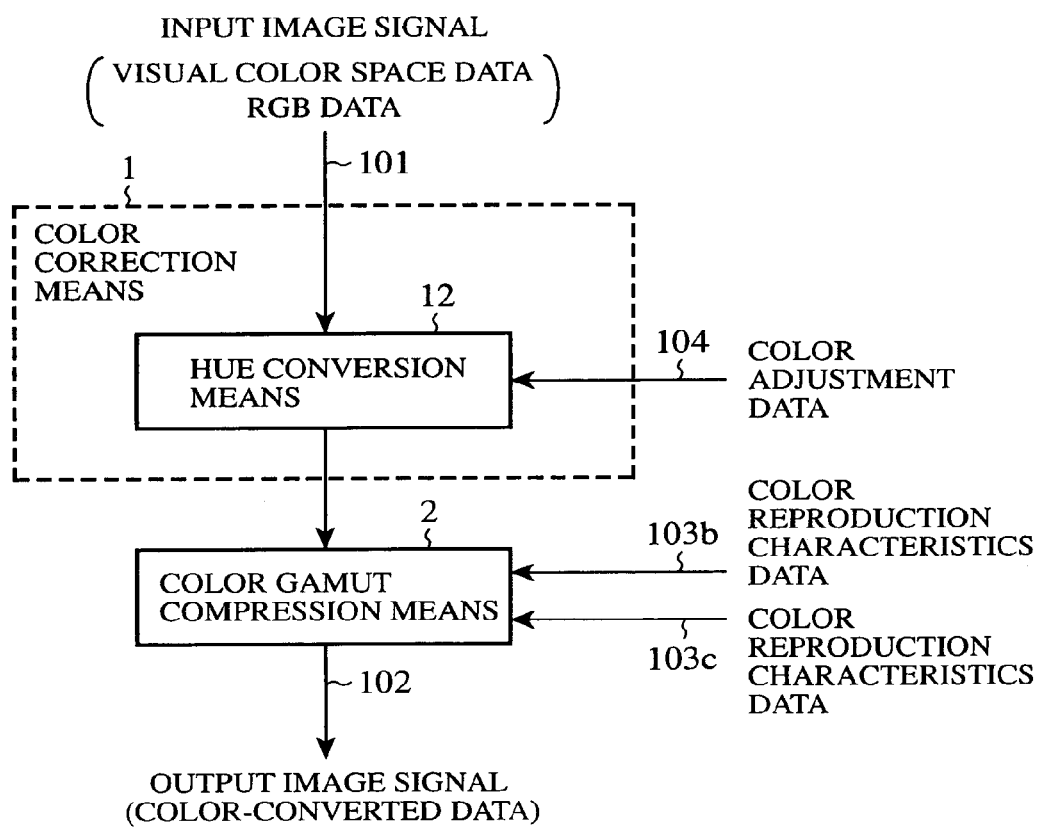
FIG. 11 is a block diagram showing the structure of a color correction apparatus in accordance with embodiment 3 of the present invention.

FIG. 11 is a block diagram showing the structure of a color correction apparatus in accordance with embodiment 3 of the present invention. The same components as those shown in FIG. 8 or like components are designated by the same reference numerals as shown in the figure, and therefore the explanation of the components will be omitted hereafter. A color gamut compression means 2 of the color correction apparatus in accordance with embodiment 3 accepts color reproduction characteristics data 103c, as well as color reproduction characteristics data 103b, and carries out color gamut compression using these color reproduction characteristics data.

Next, the operation of the color correction apparatus in accordance with this embodiment of the present invention will be explained.

A hue conversion means 12 of the color correction means 1 shown in FIG. 11 operates like the color correction means 1 or the hue conversion means 12 in accordance with embodiment 2 which is explained with reference to FIG. 8 and so on. The explanation about the same operations as those explained in Embodiment 2 will be omitted hereafter.

The color gamut compression means 2 shown in FIG. 11 substantially operates like that as shown in FIG. 8. A characterized operation of the color gamut compression means 2 in accordance with embodiment 3 will be explained hereafter. The color gamut compression means 2 of FIG. 11 accepts a hue number and a hue value which are yet-to-be hue-converted, a hue number and a hue value which are hue-converted, and hue-converted visual color space data from the hue conversion means 12.

Figures 12, 13:
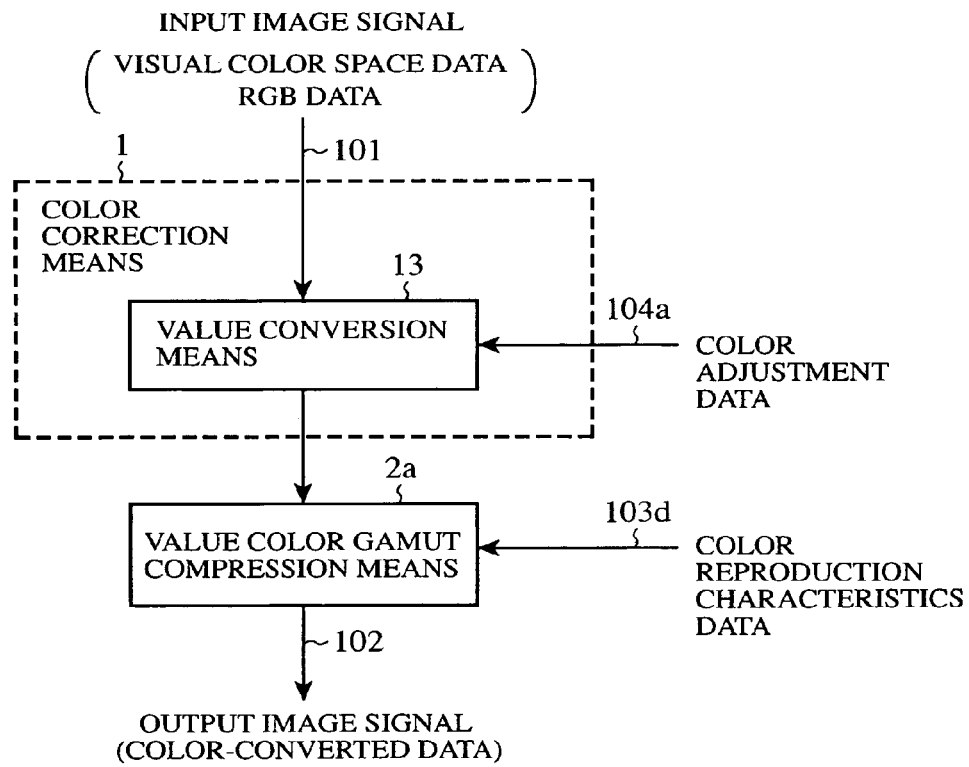
FIG. 12 is the diagram showing the structure of color reproduction characteristics data for use in the color correction apparatus in accordance with embodiment 3.
FIG. 13 is a block diagram showing the structure of a color correction apparatus in accordance with embodiment 3 of the present invention.

FIG. 12 is a diagram showing the structure of the color reproduction characteristics data for use in the color correction apparatus in accordance with embodiment 3. As shown in this figure, visual color space data indicating the color reproduction characteristics of a target color image display apparatus and visual color space data indicating the color reproduction characteristics of an original image, which indicate a color tone when the user sees the image with the naked eye, are described in the color reproduction characteristics data while they are brought into correspondence with each of a plurality of hue numbers. The visual color space data indicating the color reproduction characteristics of the color image display apparatus is the color reproduction characteristics data 103b shown in FIG. 11.

In this embodiment, an image, such as a print image, a picture, or a transparent printed matter, having a color tone which the user recognizes when visually identifying the image is referred to an original image. The visual color space data indicating the color reproduction characteristics of the original image of FIG. 12 is the color reproduction characteristics data 103c shown in FIG. 11. Each of these color reproduction data describes a chromaticity range indicating respective color reproduction characteristics, like those shown in FIG. 3 or 10.

The color gamut compression means 2 shown in FIG. 11 acquires a chromaticity range indicating the color reproduction characteristics of the color image reproduction apparatus shown in FIG. 12, i.e., the color reproduction characteristics data 103b based on the yet-to-be-hue-converted hue number inputted from the hue conversion means 12. After that, the color gamut compression means carries out processing in the same way that the color gamut compression means 2 in accordance with embodiment 1 does so as to acquire a chromaticity range indicating the color reproduction characteristics of the color image reproduction apparatus corresponding to a hue indicated by the yet-to-be-hue-converted hue number and hue value of an input image signal, and then defines the chromaticity range as a vertex a.

The color gamut compression means 2 also acquires a chromaticity range indicating the color reproduction characteristics of the original image shown in FIG. 12, i.e., the color reproduction characteristics data 103c based on the hue-converted hue number inputted from the hue conversion means 12. After that, the color gamut compression means carries out processing in the same way that the color gamut compression means 2 in accordance with embodiment 1 does so as to acquire a chromaticity range indicating the color reproduction characteristics of the original image corresponding to a hue indicated by the hue-converted hue number and hue value of the input image signal, and then defines the chromaticity range as a vertex b.

After that, as previously explained in Embodiment 1, the color gamut compression means 2 compresses the color reproduction region defined by the vertex a toward the color reproduction region defined by the vertex b, and performs the color gamut compression so that the hue-converted visual color space data has the color tone of the original image and shows a chromaticity range which is contained in the color reproduction region of the color image display apparatus.

As mentioned above, in accordance with embodiment 3, the color gamut compression means 2 performs the color gamut compression by using both the color reproduction characteristics data 103b indicating the color reproduction characteristics of a color image display apparatus, and the color reproduction characteristics data 103c indicating the color port side characteristics of an original image. Therefore, the color correction apparatus can carry out the hue conversion according to both the color reproduction characteristics of the individual color image display apparatus and the color reproduction characteristics of the original image. In addition, the present embodiment offers an advantage of being able to provide an output image signal 102 indicating an image which can be smoothly color-reproduced in consideration of the color tone of the original image by carrying out the color gamut compression based on both the color reproduction characteristics of the color image display apparatus and the color reproduction characteristics of the original image.

Embodiment 4

FIG. 13 is a block diagram showing the structure of a color correction apparatus in accordance with embodiment 3 of the present invention. The same components as those shown in FIG. 1 or like components are designated by the same reference numerals as shown in the figure, and therefore the explanation of the components will be omitted hereafter. The color correction apparatus in accordance with embodiment 4 is provided with a color correction means 1 for accepting an input image signal 101 and for performing color correction on the input image signal, and a color gamut compression means 2a for performing color gamut compression on corrected visual color space data outputted from the color correction means 1 based on color reproduction characteristics data, and for outputting color-converted data, i.e., an output image signal 102.

The color correction means 1 shown in FIG. 13 includes a value conversion means 13 for converting a value indicated by the input image signal 101 based on color adjustment data 104a.

The color adjustment data 104a is the data in which an amount of adjustment for the value of a hue to be adjusted which is preset according to the user's liking is described. To be more specific, the amount of adjustment for the value of the hue to be adjusted indicated by the visual color space data is described in the color adjustment data 104a.

Next, the operation of the color correction apparatus in accordance with this embodiment of the present invention will be explained.

The value conversion means 13 shown in FIG. 13 accepts the color adjustment data 104a from outside the color correction apparatus, and then performs value conversion on the input image signal 101 based on this color adjustment data 104a.

In this value conversion, the value conversion means operates in the same way that the color reproduction correction means 11 does as explained in Embodiment 1 so as to determine the hue number and hue value of the input image signal 101 using RGB data which constitutes the input image signal 101.

The value conversion means then performs value conversion on the visual color space data of the input image signal 101. The explanation is directed to a case where the visual color space data which constitutes the input image signal 101 is YCbCr color space data. Assume that values which form the visual color space data of the input image signal 101 are Y1, Cb1, and Cr1. The value conversion means 13 adds the amount of color adjustment which is based on the color adjustment data 104a to the value Y1, or subtracts the amount of adjustment from the value Y1 according to the sign of the data value so as to determine a value Y2 which is value-converted.

As an alternative, the value conversion means 13 can perform color adjustment, i.e., value conversion, using a value LUT showing a one-to-one correspondence between yet-to-be-converted values and converted values. A chromaticity range having a yet-to-be-converted value and corresponding to a converted value is described as, for example, each visual color space data in this value LUT. In the case of using the value LUT, the value conversion means 13 acquires a chromaticity range having a value-converted value Y2 with reference to the contents of the value LUT corresponding to the value Y1 of the visual color space data of the inputted image signal 101. The user can set the value LUT including the amount of color adjustment using a user interface or the like explained in embodiment 2. The user interface used by the user is constructed so as to have an edit function of inputting the amount of color adjustment, as mentioned above, a function of selecting a file in which the value LUT is described, a function of creating the value LUT freely, or the like. As an alternative, the user interface is constructed so as to have the plurality of functions mentioned above.

The value conversion means 13 performs value conversion on the visual color space data of the input image signal 101 in this way, and then outputs the RGB data of the input image signal 101, i.e., the RGB data indicating the yet-to-be-value-converted chromaticity range, the value Y1 of the visual color space data of the input image signal 101, the hue number and hue value of the input image signal 101, and the value-converted visual color space data to the value color gamut compression means 2a.

The value color gamut compression means 2a defines the value Y1 inputted thereto from the value conversion means 13 as a division coefficient, also defines the value Y2 of the value-converted visual color space data as a dividend coefficient, divides this dividend coefficient by the division coefficient, and defines the division result as a value coefficient. The value color gamut compression means then multiplies each value of the RGB data of the input image signal 101 by this value coefficient so as to determine data values R2, G2, and B2 as value-converted RGB data.

When either of these data values R2, G2, and B2 exceeds the bit maximum of the input image signal 101, the value color gamut compression means performs value color gamut compression on the value-converted visual color space data based on color reproduction characteristics data 103d, as will be mentioned later, and outputs the compressed and value-converted visual color space data as the output image signal 102. When any of the data values R2, G2, and B2 which are value-converted does not exceed the bit maximum of the input image signal 101, the value color gamut compression means outputs the value-converted visual color space data inputted thereto from the value conversion means 13 as the output image signal 102, just as it is.

When either of these data values R2, G2, and B2, which are determined as mentioned above, exceeds the bit maximum of the input image signal 101, the value color gamut compression means 2a performs value color gamut compression based on color reproduction characteristics data 103d, as will be explained below. The color reproduction data 103d has a structure similar to that of the color reproduction characteristics data 103a shown in FIG. 10, and contains visual color space data describing a chromaticity range indicating the color reproduction characteristics of a color image display apparatus corresponding to each hue number.

The value color gamut compression means 2a acquires a chromaticity range indicating the color reproduction characteristics of the color image display apparatus corresponding to the hue number and hue value of the input image signal 101 inputted from the value conversion means 13 based on the color reproduction characteristics data 103d and according to the same procedure as that according to which the color gamut compression means 2 does as explained in Embodiment 2.

Figure 14:
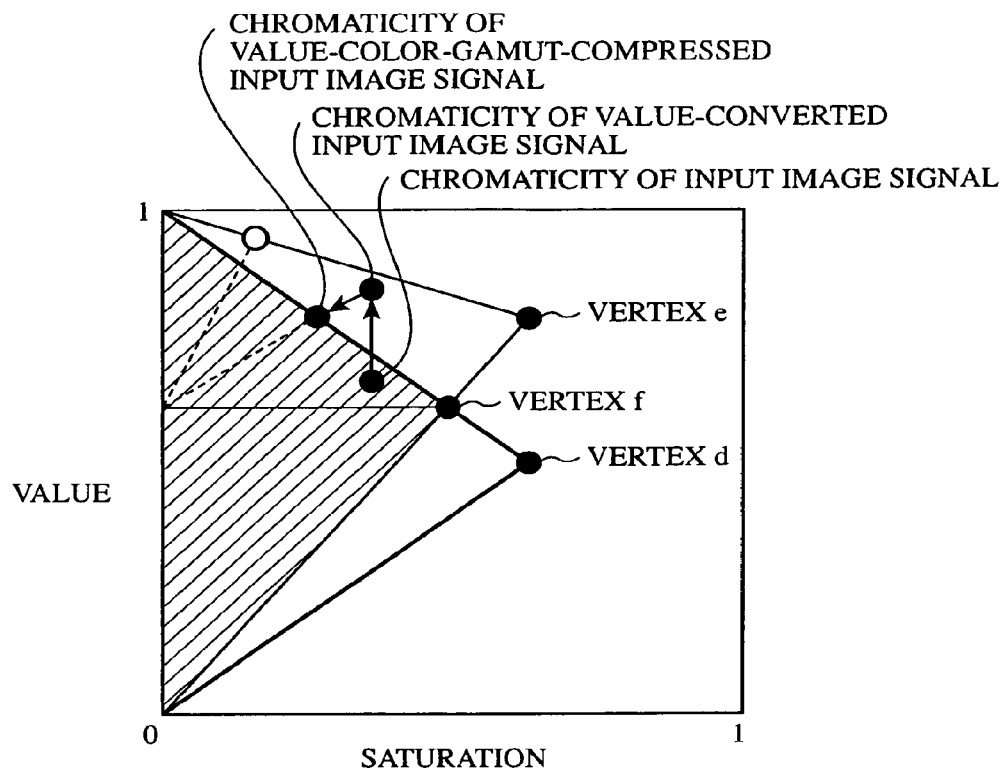
FIG. 14 is a diagram showing compression processing carried out by a value color gamut compression means in accordance with embodiment 4.

FIG. 14 is a diagram showing compression processing carried out by the value color gamut compression means in accordance with embodiment 4. The vertical axis of this figure shows the value, the horizontal axis shows the saturation, and the normalized value and saturation are shown in the figure, as in the case of FIGS. 4 to 7.

The value color gamut compression means 2a performs the same operation as that done by the color gamut compression means 2 explained in Embodiment 2 so as to acquire a chromaticity range indicating the color reproduction characteristics of the color image display apparatus corresponding to the above-mentioned hue number and hue value of the input image signal 101 from the color reproduction characteristics data 103d, and then defines the chromaticity range as a vertex d shown in FIG. 14.

The value color gamut compression means then acquires a vertex e showing a chromaticity range into which the value indicated by the vertex d is value-converted by using, for example, the value LUT, acquires a point of intersection of a triangular color reproduction region formed of the vertex e and the value axis and a triangular color reproduction region formed of the vertex d and the value axis, and defines this point of intersection as a vertex f.

The vertex d shown in FIG. 14 corresponds to the vertex a shown in FIGS. 4 to 7, the vertex e shown in FIG. 14 corresponds to the vertex b shown in FIGS. 4 to 7, and the vertex f shown in FIG. 14 corresponds to the vertex c shown in FIGS. 4 to 7. After thus acquiring the vertexes d, e, and f, the value color gamut compression means 2a performs color gamut compression, like the color gamut compression means 2 in accordance with embodiment 1 explained with reference to FIGS. 4 to 7. Since the value color gamut compression means 2a in accordance with embodiment 4 performs color gamut compression on the visual color space data on which value conversion has been performed, it is difficult for the value color gamut compression means 2a to determine a direction in which the color gamut compression is carried out as previously explained in Embodiment 1 and the value color gamut compression means 2a can carry out the color gamut compression in any of the directions shown in FIGS. 4 to 7.

According to which one of three cases is the case, the three cases including a case where the above-mentioned data value R2 exceeds the bit maximum of the input image signal 101 and the other data values G2 and B2 are equal to or smaller than the data value R2, a case where the data value G2 exceeds the bit maximum of the input image signal 101 and the other data values R2 and B2 are equal to or smaller than the data value G2, and a case where the data value B2 exceeds the bit maximum of the input image signal 101 and the other data values G2 and R2 are equal to or smaller than the data value B2, the value color gamut compression means 13 can change the value value-converted by the value conversion means 13, perform color gamut compression with a constant hue, and define the value-converted visual color space data as the output image signal 102.

The value color gamut compression means 13 can determine the difference between the bit maximum of the input image signal 101 and either of the data values R2, G2, and B2 as a value conversion coefficient, and multiply the value-converted value by the value conversion coefficient. This value conversion coefficient can be defined so that the value conversion coefficient increases with increase in the difference between the yet-to-be-value-converted value and the value-converted value.

The value color gamut compression means 13 can acquire the value-converted RGB data, i.e., the data values R2, G2, and B2 without using the value coefficient as mentioned above. Next, how to determine the data values R2, G2, and B2 without using the value coefficient will be explained.

First, the value conversion means 13 acquires a value-converted value Y2 described in the value LUT and corresponding to the value Y1 in the visual color space data of the input image signal 101, for example, the data values Y1, Cb1, and Cr1 of the YCbCr color space data. At this time, the visual color space data has the data values Y2, Cb1, and Cr1. The value conversion means 13 outputs this visual color space data, as well as the hue number and hue value of the input signal 101, to the value color gamut compression means 2a.

By using a conversion means disposed therein for converting color space data into RGB data, the value color gamut compression means 2a converts the visual color space data, for example, the YCbCr color space data, which it has acquired from the value conversion means 13, into RGB data and determines data values R2, G2, and B2 from the RGB data. Processing which will be performed after the conversion is the same as that explained above.

As an alternative, the value conversion means 13 can carry out the value conversion based on a color selected by the user and the amount of color adjustment set by the user.

Next, the value conversion which is based on a color selected by the user will be explained.

When performing the value conversion for a selected chromaticity range, an amount of color adjustment is set for the hue of the selected color and an amount of color adjustment is also set for a hue in the vicinity of the hue of the selected color. The value conversion means 13 carries out the value conversion for the hue of the selected color and the hue in the vicinity of the hue of the selected color.

The user selects a color and sets the amount of color adjustment using a user interface or the like. This user interface has the same function and structure as that explained in Embodiment 1 and so on. For example, the user interface has an edit function of allowing the user to select a color, and a function of allowing the user to select or edit the amount of color adjustment for the selected color, and allowing the user to select or edit an amount of color adjustment for a chromaticity range other than the selected color so that the value for only a specific hue can change.

The value conversion means 13 compares the chromaticity range indicated by the visual color space data of the input image signal 101 with the chromaticity range of the selected color set through the user interface, and, when they match with each other, adds the amount of color adjustment set through the user interface to the value Y1 described in the visual color space data of the input image signal 101, subtracts the amount of color adjustment from the value Y1 according to the sign of the amount of color adjustment, or multiplies the amount of color adjustment by the value Y1 as the case may be, so as to determine the value-converted value Y2.

In a case where the amount of color adjustment is unknown, such as a case where the user does not set the amount of color adjustment, the value conversion means 13 can subtract the value Y1 of the visual color space data of the input image signal 101 from the value Y2 described in the value LUT so as to determine the amount of color adjustment. In order to perform this processing, the value conversion means 13 of the color correction apparatus is equipped with a processing means for selecting a file in which the value LUT is described or a processing means for creating the value LUT freely, or both of these processing means.

The value conversion means 13 can alternatively determine the value Y2 into which the value Y1 is value-converted with reference to the value LUT.

The user interface can allow the user to select two or more colors. The color correction apparatus can display a color chart on the input means via the user interface so as to allow the user to select two or more colors from the color chart while the user visually recognizes them.

The user interface which the user uses to select two or more colors operates as follows. The user interface allows the user to select a small number of chromaticity ranges, such as one color or two colors. The value conversion means performs the value conversion on each selected color based on two or more types of value LUT selected by the user via the user interface. In order to enable the value conversion means to perform the value conversion on each of the two or more selected colors, the user interface is equipped with a processing means for setting up a value LUT for another chromaticity range which does not correspond to any of the selected colors. The processing means causes the value conversion means 13 to carry out the value conversion based on a value LUT for another hue. When not performing the value conversion on another color, the value conversion means performs the value conversion using a value LUT having linear conversion characteristics defined in advance as a value LUT for the other color. As an alternative, the value conversion means can allow the user to set up the value LUT having linear conversion characteristics so as to perform the value conversion on another color.

When a selected color is set by the user through the user interface, the value conversion means 13 defines a hue range including colors in the vicinity of the selected color, on which it performs the value conversion. According to the amount of color adjustment, the value conversion means 13 changes this hue range through automatic calculations. For example, when the amount of color adjustment is large, the value conversion means 13 widens the hue range, whereas when the amount of color adjustment is small, it narrows the hue range, so that it can carry out smooth value conversion. The value conversion means 13 defines a weighting factor so that the weighting factor by which the amount of adjustment is multiplied decreases as a color in question becomes far from the selected color within the hue range, and then describes the weighting factor into a value and hue LUT, so that the value conversion means can carry out smooth value conversion.

Figure 15:
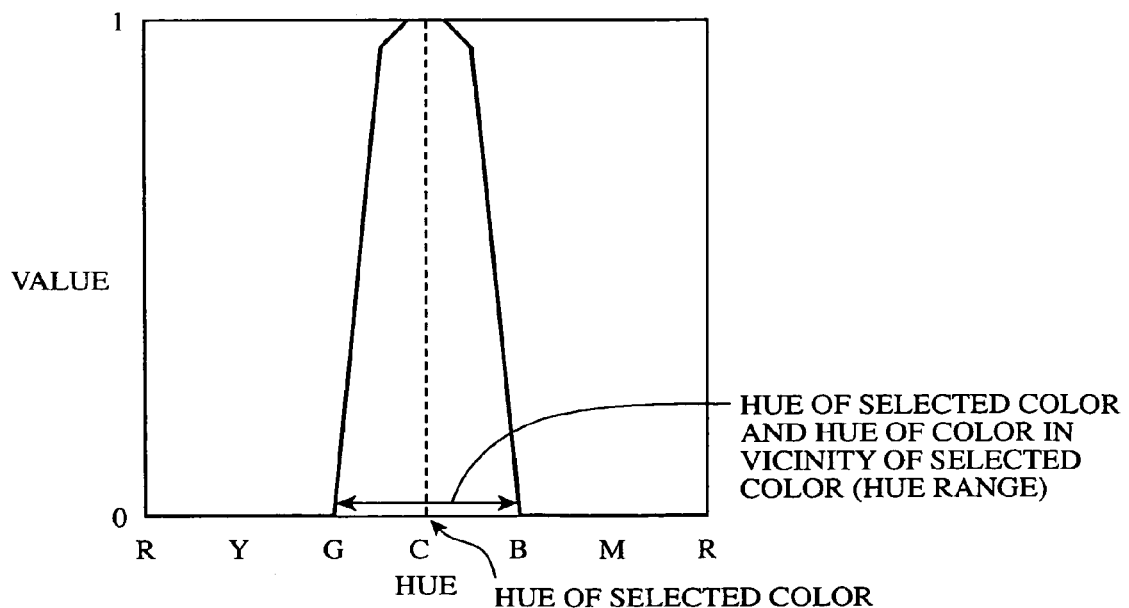
FIG. 15 is a diagram showing an example of a value hue LUT which a value correction means in accordance with embodiment 4 uses.

FIG. 15 is a diagram showing an example of the value and hue LUT which the value correction means in accordance with embodiment 4 uses. This figure shows normalized values which have been value-converted for a cyan to green hue range and a cyan to blue range which are hues in the vicinity of the cyan when the cyan is selected, as a selected color, by the user.

The value conversion means 13 acquires a weighting factor from a hue indicated by the input image signal 101 with reference to the value and hue LUT, and then multiplies a value-converted value which is described in the value LUT which corresponds to the hue indicated by the hue number and hue value of the input image signal 101 by the weighting factor which it has acquired. When the hue of the input image signal 101 is contained in the defined hue range, that is, when only a selected color (A) and another color (B) are set, since the hue of the input image signal 101 divides interiorly between the hue of the selected color (A) and a hue close to the selected color (A) within a hue range in which the other color (B) lies, the value conversion means multiplies a reference value included in a value LUT (A) corresponding to the selected color (A) by the weighting factor which it has acquired with reference to the value and hue LUT so as to acquire Y', and then multiplies a value LUT (B) corresponding to the other color (B) by a value which it has acquired by subtracting the above-mentioned weighting factor from a normalization coefficient so as to acquire Y". The value conversion means then adds Y' to Y" and defines the addition result as a converted value. The above-mentioned normalization coefficient is the bit maximum of the input image signal 101. Thus, by computing the value-converted value according to the hue of the input image signal, the value conversion means can perform the value conversion on the chromaticity range of the selected color while pinpointing it with no influence on hues other than those in the vicinity of the selected color.

The above-mentioned user interface can be provided with a processing means for setting a weighting factor for saturation so as to change the weighting factor for value according to the saturation. The weighting factor for saturation can be set so that it is contained in, for example, a value and saturation LUT. The setting of the weighting factor for saturation is performed according to such a procedure as file selection or free graphing.

Figure 16:
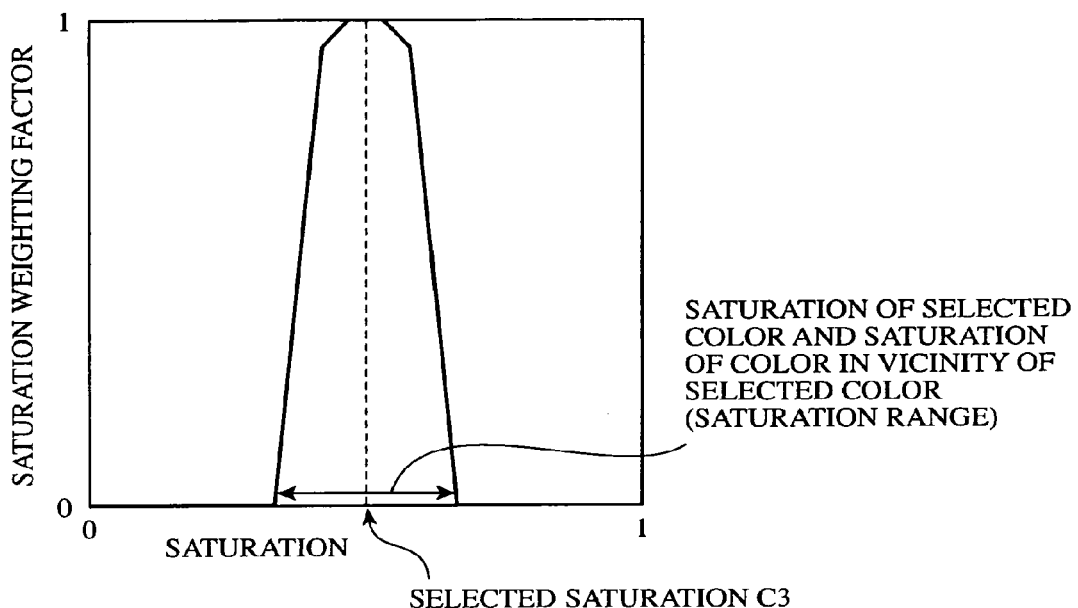
FIG. 16 is a diagram showing an example of a value saturation LUT which a value conversion means in accordance with embodiment 4 uses.

FIG. 16 is a diagram showing an example of the value and saturation LUT which the value conversion means in accordance with embodiment 4 uses. In the value and saturation LUT, the weighting factor which is set so as to vary according to the saturation is described so that only saturations in the vicinity of a saturation which the chromaticity range to be value-converted has are converted.

The value conversion means 13 acquires a saturation from the chromaticity range of the selected color which is set by the user through the above-mentioned user interface. For example, the value conversion means 13 defines the distance between the chromaticity range of the selected color and the point of origin in a Cb1 and Cr1 chromaticity range plane as a saturation C1. The value conversion means then computes the hue number and hue value of the selected color, as previously explained.

The value conversion means 13 acquires color reproduction characteristics data 103d, and also acquires a chromaticity range indicating the color reproduction characteristics of the color image display apparatus which are based on the color reproduction characteristics data 103d by using the hue number and hue value of the selected color which it has determined as mentioned above. The value conversion means defines the chromaticity range indicating the color reproduction characteristics of the color image display apparatus as a vertex g. The value conversion means then acquires a point of intersection of a straight line having the same value as the selected color and a triangle formed of the vertex g and the value axis and indicating a color reproduction region, computes a point which has the same value as the selected color and is located at the outermost skin from the point of intersection, and defines this computed point as a saturation C2. The value conversion means then divides the bit maximum of the input image signal 101 by the saturation C2 so as to acquire a saturation normalization coefficient. The value conversion means further multiplies the saturation C1 by the saturation normalization coefficient so as to acquire a saturation C3.

The value and saturation LUT illustrated in FIG. 16 is set so that the saturation coefficient is maximized at the saturation C3 which the value conversion means computes as mentioned above, and an arbitrary saturation range is arranged so that the saturation coefficient decreases with increase in the distance from the saturation C3. The saturation weighting factor is set to 0 for any saturation which does not fall within the saturation range.

The value conversion means 13 determines the difference (Y2−Y1) between the value Y1 of the visual color space data of the input image signal 101 and the value-converted value Y2 determined using the value LUT, multiplies the difference (Y2−Y1) by the saturation weighting factor, adds the value Y1 to the multiplication result, and then defines the addition result as Y2'. Y2' is assumed to be the value-converted value. Thus, by computing the converted value Y2' according to the saturation of the selected color, the value conversion means can perform the value conversion on the chromaticity range of the selected color while pinpointing it with no influence on the saturations of chromaticity ranges other than those in the vicinity of the selected color.

The value and saturation LUT can be set so that a value-converted value in the vicinity of the value axis as shown in FIG. 14 becomes small. When the selected color is set and the value conversion is then carried out, a value in the vicinity of the value axis may have a change which varies largely for every hue. Therefore, in order to prevent the difference between the values of any two adjacent hues in the vicinity of the value axis from becoming large, the value and saturation LUT is set so that the saturation weighting factor is equal to or smaller than 1 in a low-saturation color gamut, whereas the saturation weighting factor is set to 1 in a higher saturation color gamut.

As mentioned above, in accordance with embodiment 4, the value conversion means 13 performs the value conversion on the input image signal 101 based on the color adjustment data 104a, and the value color gamut compression means 2a performs the value color gamut compression based on the color reproduction characteristics of a color image display apparatus described in the color reproduction characteristics data 103d. As a result, the color correction apparatus in accordance with this embodiment can carry out the value conversion according to the color reproduction characteristics of the individual color image display apparatus. Therefore, the present embodiment offers an advantage of being able to acquire an output image signal 102 which can be smoothly color-reproduced by the color image display apparatus by performing the value color gamut compression on the value-converted visual color space data based on the color reproduction characteristics of the color image display apparatus.

Since the color correction apparatus in accordance with this embodiment can perform the value conversion on a selected color, it can reduce only the value of the chromaticity range of the sky, for example. As a result, the present embodiment offers another advantage of being able to raise the saturation of the color of the sky, and hence to perform smooth value conversion on only a hue in the vicinity of the hue of the selected color.

In addition, since the value conversion means 13 carries out the value conversion while setting the saturation weighting factor in a low saturation region to 1 or less, the value conversion means 13 can reduce the difference between the values of any two adjacent hues in the vicinity of the value axis when performing the value conversion on the selected color. As a result, the present embodiment offers a further advantage of being able to prevent the image quality from degrading due to moiré which occurs in the low saturation region.

Embodiment 5

Figure 17:
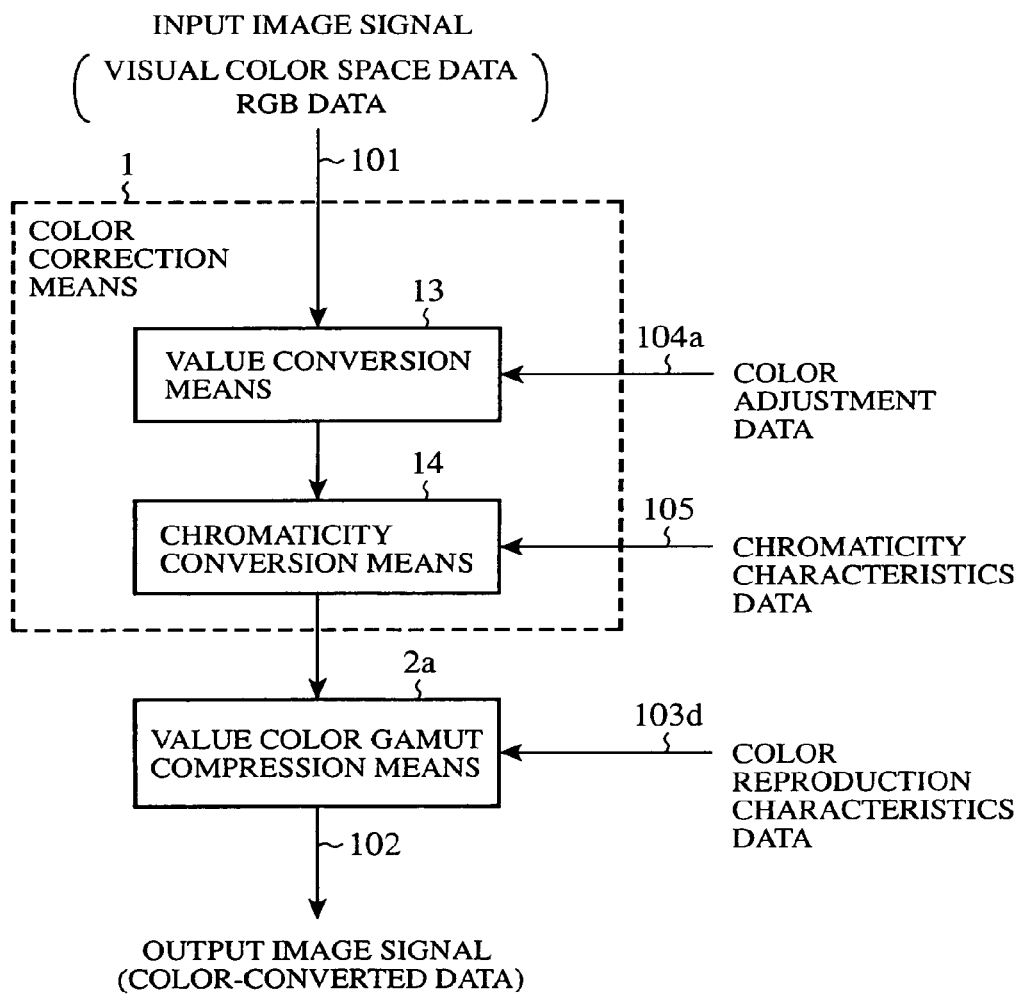
FIG. 17 is a block diagram showing the structure of a color correction apparatus in accordance with embodiment 5 of the present invention.

FIG. 17 is a block diagram showing the structure of a color correction apparatus in accordance with embodiment 5 of the present invention. The same components as those shown in FIGS. 1 and 7 or like components are designated by the same reference numerals as shown in the figures, and therefore the explanation of the components will be omitted hereafter.

The color correction apparatus in accordance with embodiment 5 includes a color correction means 1 for performing value conversion on an input image signal 101, the color correction means 1 having a value conversion means 13 for performing value conversion on the input image signal 101 based on color adjustment data 104a, and a chromaticity range conversion means 14 for performing chromaticity range conversion on value-converted visual color space data outputted from the value conversion means 13 based on chromaticity range characteristics data 105, and for outputting the chromaticity range-converted visual color space data to value color gamut compression means 2a.

Next, the operation of the color correction apparatus in accordance with this embodiment of the present invention will be explained.

The value conversion means 13 and the value color gamut compression means 2a shown in FIG. 17 operate, like the value conversion means 13 and the value color gamut compression means 2a which are explained in Embodiment 4. The explanation about the same operations as those of the color correction apparatus in accordance with embodiment 4 will be omitted hereafter, and a characterized operation of the color correction apparatus in accordance with embodiment 5 will be explained hereafter.

The chromaticity range conversion means 14 furnishes RGB data of the input image signal 101 inputted thereto from the value conversion means 13, i.e., the RGB data indicating a yet-to-be-value-converted chromaticity range, a value Y1 of the visual color space data of the input image signal 101, the hue number and hue value of the input image signal 101, and the value-converted visual color space data to the value color gamut compression means 2a.

The chromaticity range conversion means 14 is provided with a conversion means for converting visual color space data into RGB data, determines data the value-converted RGB data, i.e., values R2 and G2, and B2 based on the value Y2 of the value-converted visual color space data, and outputs these data values to the value color gamut compression means 2a shown in FIG. 17. The value color gamut compression means 2a shown in FIG. 17 does not need to be provided with the conversion means for converting visual color space data into RGB data.

The chromaticity range conversion means 14 acquires the chromaticity range characteristics data 105 from outside the color correction apparatus, and then transforms the value axis shown in FIG. 14 based on the chromaticity range characteristics data 105 and the value Y1 of the input image signal 101 inputted thereto from the value conversion means 13. This transformation of the value axis is to transform the value axis showing the value Y, which is crossing a CbCr plane in, for example, a YCbCr color space, so that the value axis is drawn nonlinearly or is inclined with respect to the CbCr plane.

The transformation of the value axis is carried out as will be explained below. For example, the chromaticity range conversion means 14 is provided with both a CbLUT used for converting a Cb value and a CrLUT used for converting a Cr value in the YCbCr color space, nonlinearly converts the value axis using a chromaticity range described by the CbLUT and CrLUT, and converts the chromaticity range indicated by the value-converted visual color space data so that the color tone of the original image can be reproduced.

Based on the value Y2 of the value-converted visual color space data inputted thereto from the value conversion means 13, the chromaticity range conversion means determines the chromaticity range-converted chromaticity range values Cb2 and Cr2 with reference to the CbLUT and CrLUT. When the value-converted Cb value and Cr value are described in the CbLUT and CrLUT while they are associated with the yet-to-be-value-converted value Y1, the chromaticity range conversion means can refer to the CbLUT and CrLUT based on the value Y1 of the input image signal 101 outputted from the value conversion means 13 so as to determine the chromaticity range-converted chromaticity range values Cb2 and Cr2.

The chromaticity range conversion means 14 then outputs both the visual color space data on which it has performed the chromaticity range conversion in this way, and the data values R2, G2, and B2 to the value color gamut compression means 2a.

The value color gamut compression means 2a shown in FIG. 17 accepts both the data values R2, G2, and B2 and the chromaticity range-converted visual color space data, and then performs the color gamut compression based on the color reproduction characteristics data 103d in the same way that the value color gamut compression means 2a in accordance with embodiment 4 does with the exception that the value color gamut compression means 2a carries out the process of determining the data values R2, G2, and B2 as explained in Embodiment 4.

As mentioned above, in accordance with embodiment 5, the chromaticity range conversion means 14 nonlinearly transforms the value axis based on the chromaticity range characteristics data 105. By transforming the value axis while carrying out the value conversion, the color correction apparatus can incorporate the color tone of the original image into the value-converted visual color space data so that the visual color space data has a chromaticity range which is contained in the color reproduction region of the color image display apparatus. Therefore, the present embodiment offers an advantage of being able to acquire an output image signal 102 having a color tone peculiar to the original image.

Embodiment 6

Figure 18:
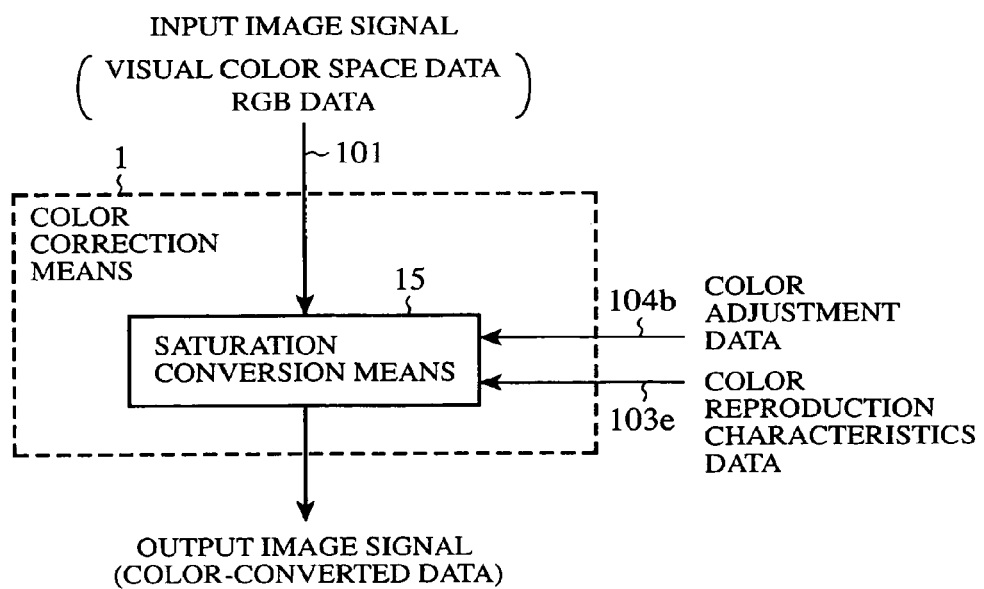
FIG. 18 is a block diagram showing the structure of a color correction apparatus in accordance with embodiment 6 of the present invention.

FIG. 18 is a block diagram showing the structure of a color correction apparatus in accordance with embodiment 6 of the present invention. The same components as those shown in FIG. 1 or like components are designated by the same reference numerals as shown in the figures, and therefore the explanation of the components will be omitted hereafter.

The color correction apparatus in accordance with embodiment 6 includes a color correction means 1 for making a color correction to an input image signal 101, the color correction means 1 being provided with a saturation conversion means 15 for converting the saturation of the input image signal 101.

Color adjustment data 104b is the same as the color adjustment data 104 or the like inputted to the hue conversion means 12 explained in Embodiment 2 or the like, and are the data in which an amount of adjustment for saturation set according to the user's liking is described. A hue having a saturation to be converted and the amount of adjustment for saturation are described in the color adjustment data.

Color reproduction characteristics data 103e is the same as the color reproduction characteristics data 103a explained in Embodiment 2, and is, for example, the data in which a chromaticity range indicating the color reproduction characteristics of a color image display apparatus is described while it is associated with a hue number, as shown in FIG. 10.

Next, the operation of the color correction apparatus in accordance with this embodiment of the present invention will be explained.

The saturation conversion means 15 accepts visual color space data indicating an arbitrary chromaticity range and RGB data, which constitute the input image signal 101, and carries out processing using this RGB data in the same way that the color reproduction correction means 11 explained in Embodiment 1 does so as to determine the hue number and hue value of the input image signal 101.

The saturation conversion means 15 then converts a saturation indicated by the visual color space data of the input image signal 101 based on the color reproduction characteristics data 103e and the color adjustment data 104b which it has acquired from outside the color correction apparatus. This saturation conversion processing will be explained by taking, as an example, a case where the visual color space data of the input image signal 101 is YCbCr color space data. Data values showing the chromaticity range of the visual color space data of the input image signal 101 are Y1, Cb1, and Cr1.

The saturation conversion means defines the hue number of the input image signal 101 determined as mentioned above as a hue number (H), and also defines the hue value of the input image signal 101 as a hue value (H). The saturation conversion means then acquires a chromaticity range indicating the color reproduction characteristics of the color image display apparatus corresponding to the hue number (H) with reference to the color reproduction characteristics data 103*e*. The saturation conversion means further acquires a chromaticity range of the color image display apparatus corresponding to the hue number (H+1), which is the sum of 1 and the hue number (H) of the input image signal 101, with reference to the color reproduction characteristics data 103*e* corresponding to the hue number (H+1).

After that, the saturation conversion means handles both the chromaticity range of the hue number (H) and the chromaticity range of the hue number (H+1) as chromaticity range vectors, respectively, like the color gamut compression means 2 explained in Embodiment 1, and carries out processing as explained in Embodiment 1. The saturation conversion means thus acquires a chromaticity range indicating the color reproduction characteristics of the color image display apparatus corresponding to the hue indicated by the hue number (H) and hue value (H) of the input image signal 101. When the chromaticity range thus acquired is shown by a vertex h in a visual color space defined by a value axis and a saturation axis which-intersect perpendicularly as shown in FIG. 4 and so on, a color reproduction region of the color image display apparatus corresponding to the hue indicated by he hue number (H) and hue value (H) of the input image signal has the shape of a triangle formed of coordinates (0, 0) and (0, 1) on the value axis, and the vertex h.

The saturation conversion means then computes a point (H) at the outermost skin of the triangular color reproduction region where the value is equal to Y1 of the visual color space data of the input image signal 101. The saturation conversion means further computes the saturation of the input image signal 101 by using the visual color space data of the input image signal 101, and defines this computed saturation as C1. The saturation conversion means also defines the saturation of the outermost skin point (H) of the color reproduction region as C2. The saturation conversion means then divides the bit maximum of the input image signal 101 by the saturation C2 of the outermost skin point (H) so as to acquire a saturation normalization coefficient. The saturation conversion means further multiplies the saturation C1 by the saturation normalization coefficient so as to determine a saturation C3.

The saturation conversion means 15 is provided with a saturation LUT including saturation weighting factors dependent upon saturations, and acquires a saturation weighting factor corresponding to the saturation C3 with reference to this saturation LUT. The saturation conversion means 15 multiplies the amount of adjustment described in the color adjustment data 104*b* by the acquired saturation weighting factor, and adds the multiplication result to the saturation C1 so as to determine a saturation C4. The saturation conversion means 15 then computes chromaticity range values Cb2 and Cr2 corresponding to the saturation C4, and outputs the visual color space data on which it has performed the saturation conversion in this way as an output image signal 102.

The saturation LUT which the above-mentioned saturation conversion means 15 has can be described including the amount of adjustment for saturation. By using such the saturation LUT, the saturation conversion means 15 carries out processing as follows. The saturation conversion means 15 divides the bit maximum of the input image signal 101 by the saturation C2 at the outermost skin point (H) so as to acquire a saturation normalization coefficient. The saturation conversion means 15 then multiplies the saturation C1 by the saturation normalization coefficient so as to determine a saturation C3. With reference to the saturation LUT, the saturation conversion means 15 further determines a saturation C4 which it has acquired by performing the saturation conversion on the saturation C3. The saturation conversion means 15 also defines C4/C3 as a saturation coefficient and multiplies the chromaticity range values Cb1 and Cr1 of the visual color space data of the input image signal 101 by the saturation coefficient so as to determine saturation-converted chromaticity range values Cb2 and Cr2. The saturation conversion means 15 can thus carry out the saturation conversion and output the saturation-converted visual color space data as an output image signal 102.

A user interface as explained in Embodiment 2 can be connected to the saturation conversion means 15, and the saturation conversion means 15 can acquire a hue selected by the user via the user interface and can perform the saturation conversion using saturation LUTs which are respectively set for the selected hue and another hue.

The saturation conversion means 15 which operates in this way has a saturation and hue LUT in which a weighting factor by which the saturation LUT is multiplied is described. The saturation conversion means 15 carries out processing, such as setting of a hue on which the saturation conversion is to be performed, setting of the saturation LUT, and computation of the saturation and hue LUT, in the same way that the value conversion means carries out the value conversion as explained in Embodiment 4, or carries out like processing, and performs an operation of determining a saturation-converted saturation in the same way that it does the operation of determining a value-converted value, or carries out like processing.

As mentioned above, in accordance with embodiment 6, the saturation conversion means 15 carries out the saturation conversion based on color reproduction characteristics data 103*e*. Therefore, the present embodiment offers an advantage of being able to carry out the saturation conversion according to the color reproduction characteristics of an individual color image display apparatus.

The color correction apparatus in accordance with the present invention can be constructed of a combination of two or more of the color correction apparatus explained in above-mentioned embodiments 1 to 6. For example, the color correction apparatus can be so constructed as to include the hue conversion means 12, the value conversion means 13, the chromaticity range conversion means 14, the saturation conversion means 15 and so on, and a color gamut compression means for performing the color gamut compression on visual color space data converted by each of those conversion means based on color reproduction characteristics data.

When the color correction apparatus is so constructed, it can correct the hue, value, and saturation in two or three dimension. Especially, the color correction apparatus according to this variant is effective for converting the hue, value, and saturation of an arbitrary chromaticity range, or converting both the hue, value, and saturation of an arbitrary chromaticity range and the hue, value, and saturation of a chromaticity range in the vicinity of the arbitrary chromaticity range.

The color correction apparatus constructed as above can carry out the color correction freely in three dimension in the color space. The color correction apparatus constructed as above can also convert the hue, value, and saturation in three dimension at a high processing speed, without having to use a three dimensional LUT.

INDUSTRIAL APPLICABILITY

As mentioned above, the color correction apparatus and the color correction method in accordance with the present invention are suitable for making a color correction to an image signal according to color reproduction characteristics.

The invention claimed is:

1. A color correction apparatus comprising:
   a color corrector that makes a color correction to an input image signal; and
   a color gamut compressor that performs color gamut compression on the color-corrected color-corrected image data outputted from said color corrector has a chromaticity range which is corrected image data outputted from said color corrector has a chromaticity range which is contained in a color reproduction region which is based on said color reproduction characteristics wherein:
   said color gamut compressor determines a hue of the image data converted by said color corrector, acquires both:
   an input chromaticity range from the input image signal based on the data describing the color reproduction characteristics, said input chromaticity range indicating said color reproduction characteristics corresponding to a hue of the input image signal, and
   an output chromaticity range based on the data describing the color reproduction characteristics, said output range indicating said color reproduction characteristics corresponding to the hue of the image data converted by said color corrector.

2. The color correction apparatus according to claim 1, wherein said color corrector is provided with a color reproduction corrector that converts a chromaticity range of the input image signal based on the data describing the color reproduction characteristics.

3. The color correction apparatus according to claim 1, wherein said color corrector is provided with a hue converter that converts a hue of the input image signal based on data describing the hue to be converted and an amount of adjustment.

4. The color correction apparatus according to claim 1, wherein said color gamut compressor performs the color gamut compression on the color-corrected input image signal based on data describing color reproduction characteristics of a color image display apparatus.

5. The color correction apparatus according to claim 1, wherein said color gamut compressor
   determines a convergence point from both a color reproduction region defined by the input chromaticity range, and a color reproduction region defined by the output chromaticity range, and
   performs the color gamut compression on the color-corrected image data outputted from said color corrector in a direction of said convergence point.

6. The color correction apparatus according to claim 5, wherein said color gamut compressor
   acquires the input chromaticity range and the output chromaticity range, when the color reproduction region defined by the input chromaticity range and the color reproduction region defined by the output chromaticity range are expressed in a color space,
   determines a point of intersection where the color reproduction region for the hue of said input image signal and the color reproduction region for the hue of said converted image data intersect in a plane showing value and saturation,
   determines a convergence point having a value equal to that of said point of intersection and being on a value axis showing said color space, and
   compresses the color reproduction region for the hue of said input image signal toward said convergence point.

7. The color correction apparatus according to claim 5, wherein said color gamut compressor
   acquires the input chromaticity range and the output chromaticity range, when the color reproduction region defined by the input chromaticity range and the color reproduction region defined by the output chromaticity range are expressed in a color space,
   determines a point of intersection where the color reproduction region for the hue of said input image signal and the color reproduction region for the hue of said converted image data intersect in a plane showing value and saturation,
   defines an arbitrary point on a straight line connecting said point of intersection with the output chromaticity range,
   determines a convergence point having a value equal to that of said arbitrary point and being on a value axis showing said color space, and
   compresses the color reproduction region for the hue of said input image signal toward said convergence point.

8. The color correction apparatus according to claim 1, wherein said color gamut compressor
   acquires a second input chromaticity range indicating first color reproduction characteristics of a hue of the input image signal based on data indicating the first color reproduction characteristics and describing color reproduction characteristics of a color image display apparatus,
   acquires a second output chromaticity range indicating second color reproduction characteristics data of a hue indicated by the image data converted by said color corrector based on data indicating the second color reproduction characteristics and describing color reproduction characteristics of an original image showing a color tone of a visually-identified image,
   acquires a convergence point from both a color reproduction region defined by the second input chromaticity range, and a color reproduction region defined by the second output chromaticity range, and
   compresses the color reproduction region defined by the second input chromaticity range toward the convergence point.

9. The color correction apparatus according to claim 1, wherein
   said color corrector acquires color adjustment data describing both a hue to be value-converted and an amount of adjustment for value, and has a value converter that converts a value indicated by the input image signal based on said color adjustment data, and
   said color gamut compressor
   acquires a third input chromaticity range indicating color reproduction characteristics of a hue of the input image signal based on the data describing the color reproduction characteristics,
   acquires a value-converted chromaticity range with reference to a look-up table in which a hue value-converted by said value converter is described,
   acquires a convergence point from both a color reproduction region defined by the third input chromaticity range and a color reproduction region defined by said value-converted chromaticity range, and compresses the color reproduction region defined by the third input chromaticity range toward the convergence point.

10. The color correction apparatus according to claim 9, wherein said value converter determines both a value of a hue selected by a user and a value of a hue in a vicinity of the selected hue using a value look-up table in which a value-converted value is described.

11. The color correction apparatus according to claim 9, wherein said color corrector is provided with a chromaticity range converter that transforms a value axis indicating a color space, and said color gamut compressor acquires a convergence point on the value axis which is converted by said chromaticity range converter from both the color reproduction region defined by the third input chromaticity range expressed in said color space and the color reproduction region defined by the value-converted chromaticity range.

12. A color correction apparatus comprising: a saturation conversion means for converting a saturation of an input image signal based on both color adjustment data describing both a hue to be saturation-converted and an amount of adjustment, and color reproduction characteristics data describing color reproduction characteristics of a color image display apparatus.

13. A color correction method comprising:

converting a hue indicated by image data using a hue converter;

converting a value indicated by the image data acquired from said hue converter using a value converter;

converting a saturation indicated by the image data acquired from said value converter based on color reproduction characteristics data describing color reproduction characteristics of a color image display apparatus using a saturation converter; and carrying out color gamut compression so that the image data acquired from said saturation converter has a chromaticity range which is contained in a color reproduction region which is based on said color reproduction characteristics using a color gamut compressor wherein said color gamut compressor determines a hue of the image data converted by said color corrector, acquires both:

an input chromaticity range from the image data based on the data describing the color reproduction characteristics, said input chromaticity range indicating said color reproduction characteristics corresponding to a hue of the input image signal, and an output chromaticity range based on the data describing the color reproduction characteristics, said output range indicating said color reproduction characteristics corresponding to the hue of the image data converted by said color corrector.

14. A color correction apparatus comprising:

a color corrector that color-corrects an input image signal; and a color gamut compressor that:

input acquires an input chromaticity range from the input image signal based on data describing color reproduction characteristics, said input chromaticity range indicating said color reproduction characteristics corresponding to a hue of the input image signal;

determines a hue of the color-corrected image signal;

output acquires an output chromaticity range based on the data describing the color reproduction characteristics, said output chromaticity range indicating those color reproduction characteristics that correspond to the determined hue of the color-corrected image signal; and compresses a color gamut of the color-corrected image signal based on the data describing the color reproduction characteristics, thereby establishing a chromaticity range for the gamut-compressed image signal such that said chromaticity range is contained in a color reproduction region based on said color reproduction characteristics.

15. The color correction apparatus according to claim 14, where said color corrector includes a color reproduction corrector that converts the input chromaticity range based on the data describing the color reproduction characteristics.

16. The color correction apparatus according to claim 14, where said color corrector includes a hue converter that converts a hue of the input image signal based on data describing the hue to be converted and an amount of adjustment.

17. The color correction apparatus according to claim 14, where the data describing the color reproduction characteristics includes data describing color reproduction characteristics of a color image display apparatus.

18. The color correction apparatus according to claim 14, where said color gamut compressor determines a convergence point from both a color reproduction region defined by the input chromaticity range, and a color reproduction region defined by the output chromaticity range, and compresses the color gamut of the color-corrected image data in a direction of said convergence point.

19. The color correction apparatus according to claim 18, where said color gamut compressor:

acquires the input and output chromaticity ranges when the color reproduction regions defined by the input and output chromaticity ranges are expressed in a color space, determines a point of intersection where the color reproduction region for the hue of said input image signal and the color reproduction region for the hue of said color-corrected image signal intersect in a plane showing value and saturation, determines a convergence point having a value equal to that of said point of intersection and being on a value axis showing said color space, and compresses the color reproduction region for the hue of said input image signal toward said convergence point.

20. The color correction apparatus according to claim 18, where said color gamut compressor acquires the input chromaticity range and the output chromaticity range when the color reproduction region defined by the input chromaticity range and the color reproduction region defined by the output chromaticity range are expressed in a color space, determines a point of intersection where the color reproduction region for the hue of said input image signal and the color reproduction region for the hue of said color-corrected image signal to intersect in a plane showing value and saturation, defines an arbitrary point on a straight line connecting said point of intersection with the output chromaticity range, determines a convergence point having a value equal to that of said arbitrary point and being on a value axis showing said color space, and compresses the color reproduction region for the hue of said input image signal toward said convergence point.

21. The color correction apparatus according to claim 14, where said color gamut compressor:
  acquires a second input chromaticity range indicating first color reproduction characteristics of a hue of the input image signal based on data indicating the first color reproduction characteristics and describing color reproduction characteristics of a color image display apparatus,
  acquires a second output chromaticity range indicating second color reproduction characteristics data of a hue indicated by the color-corrected image signal based on data indicating the second color reproduction characteristics and describing color reproduction characteristics of an original image showing a color tone of a visually-identified image,
  acquires a convergence point from both a color reproduction region defined by the second input chromaticity range, and a color reproduction region defined by the second output chromaticity range, and
  compresses the color reproduction region defined by the second input chromaticity range toward the convergence point.

22. The color correction apparatus according to claim 14, where:
  said color corrector acquires color adjustment data describing both a hue to be value-converted and an amount of adjustment for value, and has a value converter that converts a value indicated by the input image signal based on said color adjustment data, and
  said color gamut compressor
    acquires a third input chromaticity range indicating color reproduction characteristics of a hue of the input image signal based on the data describing the color reproduction characteristics,
    acquires a value-converted chromaticity range with reference to a look-up table in which a hue value-converted by said value converter is described,
    acquires a convergence point from both a color reproduction region defined by the third input chromaticity range and a color reproduction region defined by said value-converted chromaticity range, and
    compresses the color reproduction region defined by the third input chromaticity range toward the convergence point.

23. The color correction apparatus according to claim 22, wherein said value converter determines both a value of a hue selected by a user and a value of a hue in a vicinity of the selected hue using a value look-up table in which a value-converted value is described.

24. The color correction apparatus according to claim 22, wherein
  said color corrector includes a chromaticity range converter that transforms a value axis indicating a color space, and
  said color gamut compressor acquires a convergence point on the transformed value axis from both the color reproduction region defined by the third input chromaticity range expressed in said color space and the color reproduction region defined by the value-converted chromaticity range.

25. A color correction apparatus comprising:
  a saturation converter that converts a saturation of an input image signal based on color adjustment data describing both a hue to be saturation-converted and an amount of adjustment, and color reproduction characteristics data describing color reproduction characteristics of a color image display apparatus.

26. A color correction method comprising:
  converting a hue indicated by image data;
  converting a value indicated by the hue-converted image data;
  converting a saturation indicated by the value-converted image data based on color reproduction characteristics data describing color reproduction characteristics of a color image display apparatus; and
  compressing a color gamut of the image data such that the saturation-converted image data has a chromaticity range within a color reproduction region based on said color reproduction characteristics, where compressing a color gamut includes:
  determining a hue of the hue-converted image data
  first acquiring an input chromaticity range from the image data based on the data describing the color reproduction characteristics, said input chromaticity range indicating said color reproduction characteristics corresponding to a hue of the image data, and
  second acquiring an output chromaticity range based on the data describing the color reproduction characteristics, said output range indicating said color reproduction characteristics corresponding to the hue of the hue-converted image data.

* * * * *